US008559965B2

(12) United States Patent
Sumasu et al.

(10) Patent No.: US 8,559,965 B2
(45) Date of Patent: Oct. 15, 2013

(54) RADIO BASE STATION DEVICE, RADIO TERMINAL DEVICE, AND RADIO COMMUNICATION SYSTEM

(75) Inventors: Atsushi Sumasu, Kanagawa (JP);
Shutai Okamura, Osaka (JP);
Katsuhiko Hiramatsu, Leuven (BG);
Masayuki Orihashi, Kanagawa (JP);
Ayako Horiuchi, Kanagawa (JP); Daichi Imamura, Kanagawa (JP); Yoshihiko Ogawa, Kanagawa (JP)

(73) Assignee: Panasonic Corporation, Osaka (JP)

( * ) Notice: Subject to any disclaimer, the term of this patent is extended or adjusted under 35 U.S.C. 154(b) by 633 days.

(21) Appl. No.: 12/521,292

(22) PCT Filed: Dec. 25, 2007

(86) PCT No.: PCT/JP2007/074803
§ 371 (c)(1),
(2), (4) Date: Jun. 25, 2009

(87) PCT Pub. No.: WO2008/078732
PCT Pub. Date: Jul. 3, 2008

(65) Prior Publication Data
US 2010/0041413 A1    Feb. 18, 2010

(30) Foreign Application Priority Data

Dec. 26, 2006  (JP) .................................. 2006-350455
Aug. 3, 2007   (JP) .................................. 2007-203333

(51) Int. Cl.
*H04W 72/00*     (2009.01)

(52) U.S. Cl.
USPC .................... 455/452.2; 455/452.1; 370/252; 370/332

(58) Field of Classification Search
USPC .................... 370/332, 252; 455/452.2, 437
See application file for complete search history.

(56) References Cited

U.S. PATENT DOCUMENTS 6,031,827 A * 2/2000 Rikkinen et al. .............. 370/330
6,816,507 B1   11/2004 Jarbot et al.
(Continued)

FOREIGN PATENT DOCUMENTS

JP    2001-203612    7/2001
JP    2002-520922    7/2002

OTHER PUBLICATIONS

International Search Report dated Mar. 8, 2008.
(Continued)

*Primary Examiner* — Jinsong Hu
*Assistant Examiner* — Nathan Taylor
(74) *Attorney, Agent, or Firm* — Dickinson Wright PLLC

(57) ABSTRACT

It is possible to provide a radio communication system, a radio base station device, and a radio terminal device capable of reducing the power consumption in a radio terminal device without thinning pilot signals used for measuring upstream line quality. In the radio base station device (100) used in a radio communication system using different frequency bands for the upstream line and the downstream line, an upstream line pilot generation unit (115) forms a CQI measuring pilot signal and an upstream line RF unit (105) transmits the communication quality measuring pilot signal by using the upstream line use frequency band in the upstream line pilot transmission section. Thus, the upstream communication quality measuring pilot signal used by the radio base station device (100) to measure the line quality is transmitted by using the upstream line frequency band and accordingly, it is possible to reduce the power consumption in the radio terminal device.

12 Claims, 23 Drawing Sheets

(56) References Cited

U.S. PATENT DOCUMENTS

| | | | |
|---|---|---|---|
| 7,233,582 B2* | 6/2007 | Tamaki et al. | 370/332 |
| 2002/0114308 A1* | 8/2002 | Takano et al. | 370/342 |
| 2002/0177447 A1* | 11/2002 | Walton et al. | 455/452 |
| 2003/0073409 A1* | 4/2003 | Nobukiyo et al. | 455/67.1 |
| 2004/0018842 A1* | 1/2004 | Yu | 455/437 |
| 2004/0037248 A1* | 2/2004 | Tamaki et al. | 370/332 |
| 2005/0249127 A1* | 11/2005 | Huo et al. | 370/252 |
| 2006/0105761 A1* | 5/2006 | Walton et al. | 455/423 |
| 2006/0195576 A1* | 8/2006 | Rinne et al. | 709/226 |
| 2009/0016278 A1* | 1/2009 | Wakabayashi | 370/329 |

OTHER PUBLICATIONS

Y. Ofuji, et al., "Frequency Domain Channel-Dependent Scheduling with Group-wised Allocation of Transmission Bandwidth of Pilot Channel for CQI Measurement in Single-Carrier FDMA-Based Evolved UTRA Uplink," Technical Report of IEICE, RCS2006-154, Oct. 2006, pp. 125-130, p. 4, line 1.

\* cited by examiner

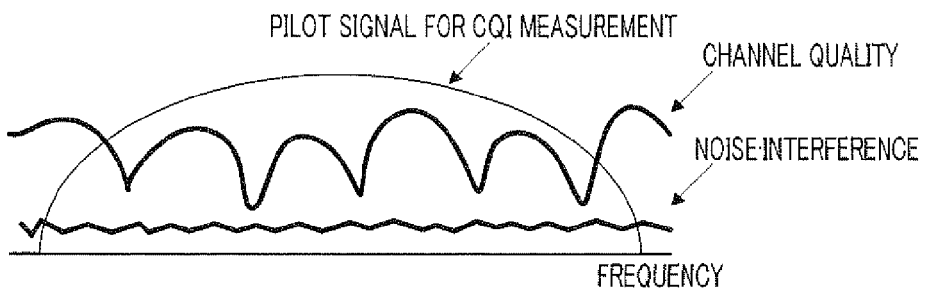
FIG.1A TRANSMIT IN THE ENTIRE BAND
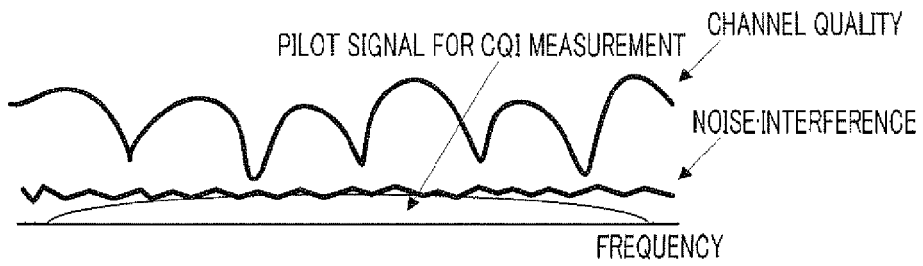
FIG.1B TRANSMIT SIGNAL IN ENTIRE BAND WITH SMALL POWER
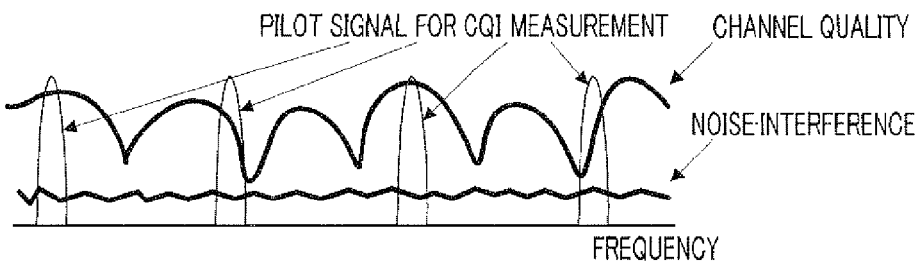
FIG.1C TRANSMIT DECIMATED SIGNAL IN FREQUENCY DOMAIN
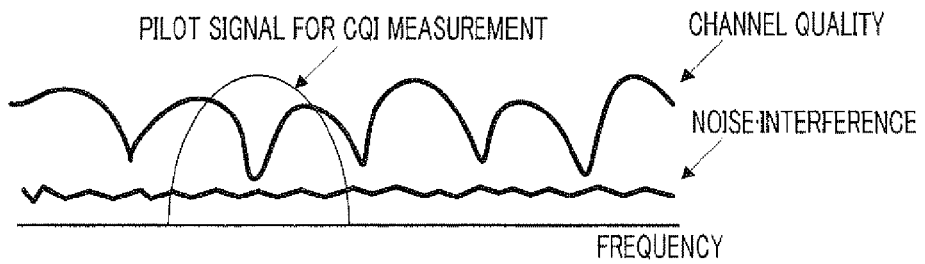
FIG.1D TRANSMIT SIGNAL IN LIMITED BAND IN FREQUENCY DOMAIN
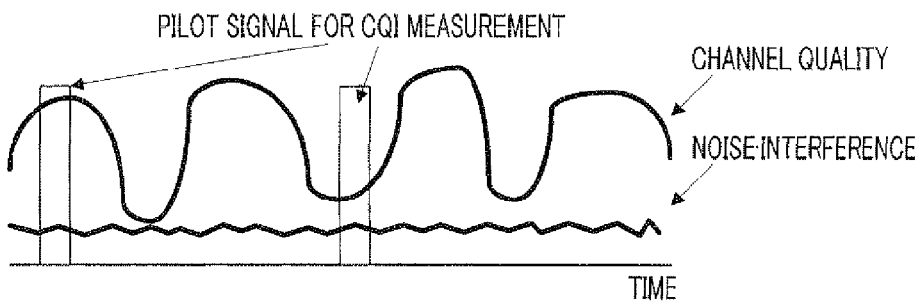
FIG.1E TRANSMITS DECIMATED SIGNAL IN TIME DOMAIN

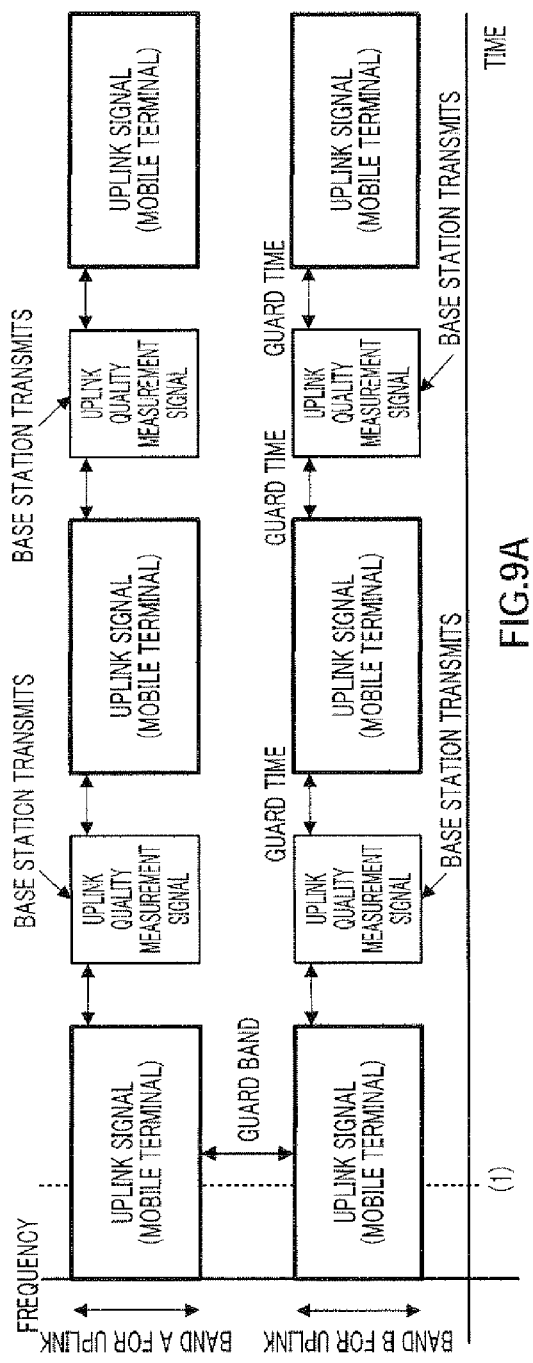
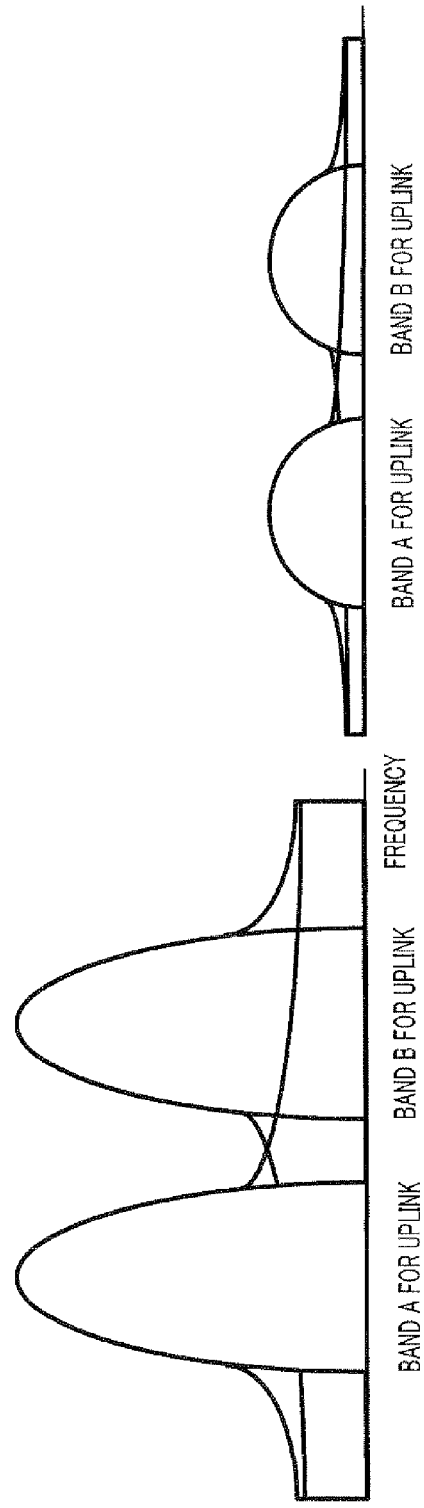
FIG.9A
FIG.9B RECEIVED POWER IN MOBILE TERMINAL AT TIMING 1
FIG.9C RECEIVED POWER IN BASE STATION AT TIMING 1

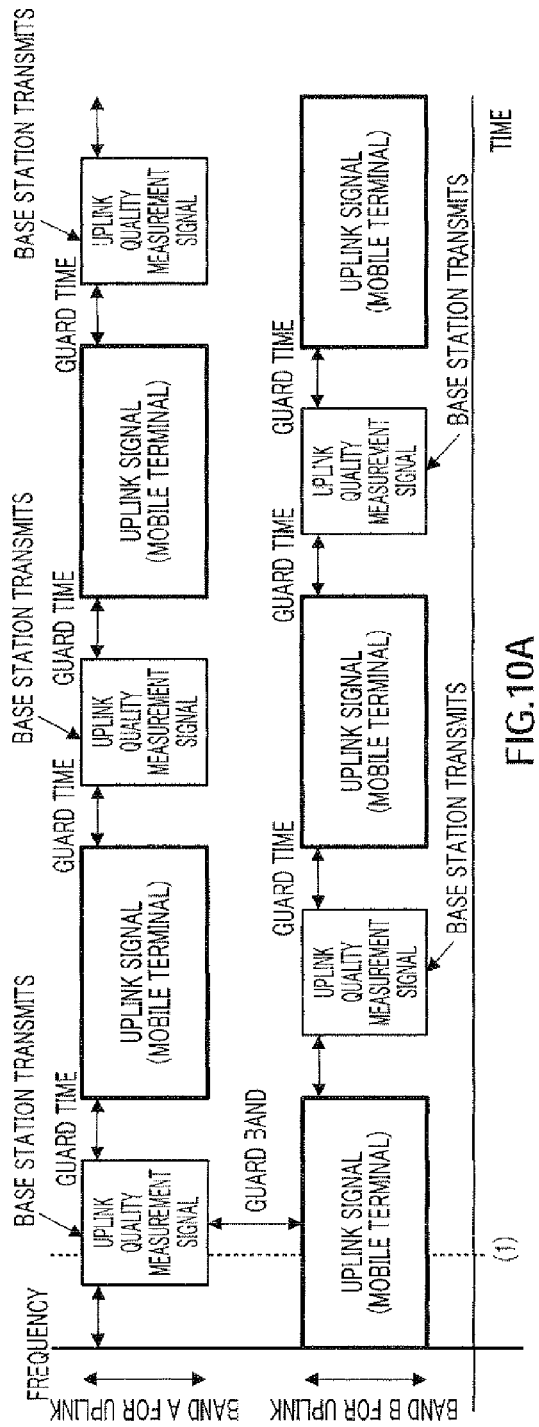
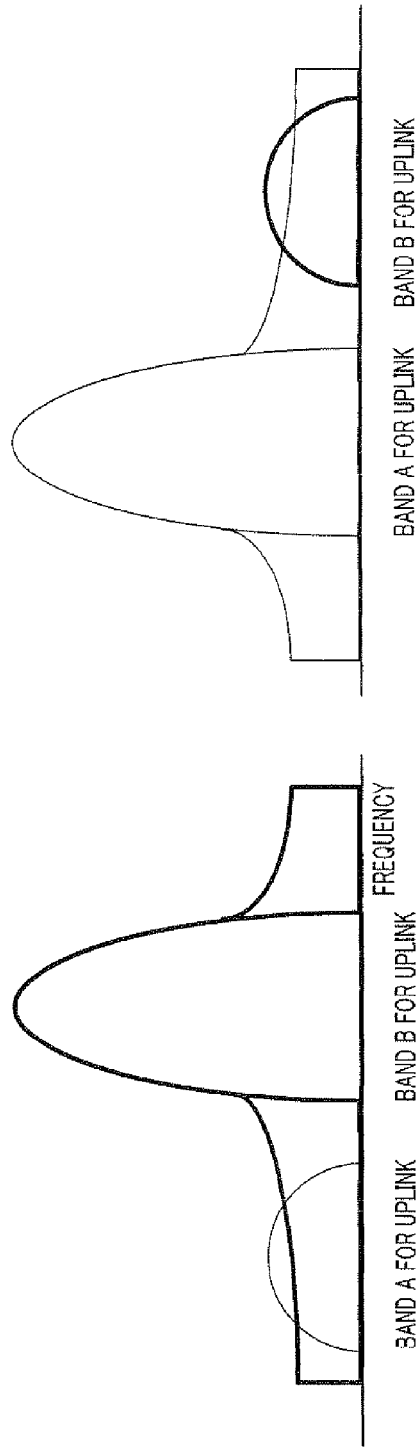
FIG.10A
FIG.10B RECEIVED POWER IN MOBILE TERMINAL AT TIMING 1
FIG.10C RECEIVED POWER IN BASE STATION AT TIMING 1

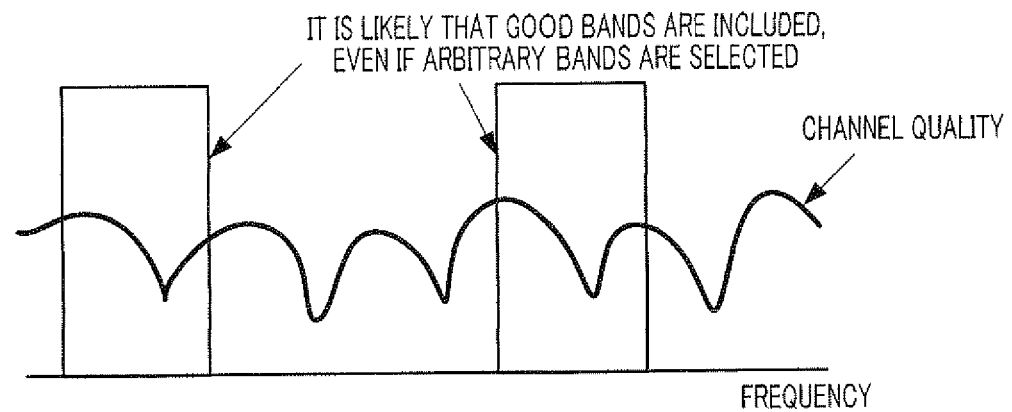
FIG.23A IN CASE OF GREAT FREQUENCY SELECTIVITY
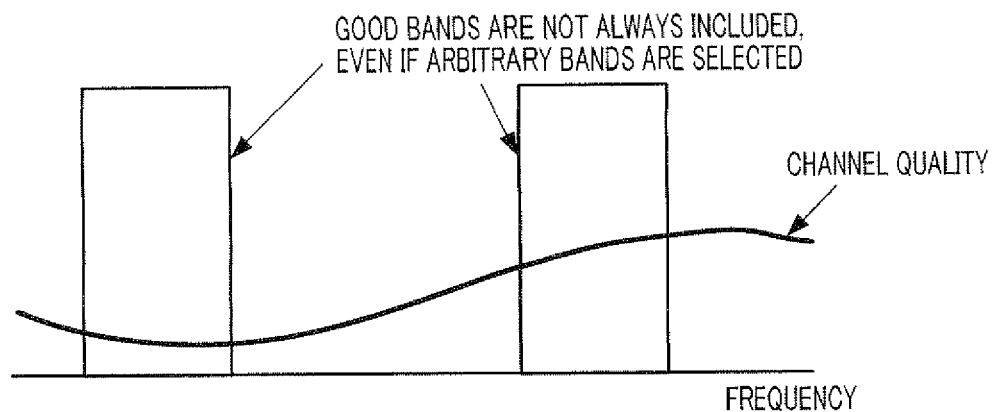
FIG.23B IN CASE OF LITTLE FREQUENCY SELECTIVITY

RADIO BASE STATION DEVICE, RADIO TERMINAL DEVICE, AND RADIO COMMUNICATION SYSTEM

TECHNICAL FIELD

The present invention relates to a radio base station apparatus, a radio terminal apparatus and a radio communication system where different frequency bands are used between uplink and downlink.

BACKGROUND ART

In the field of wireless cellular systems, which are represented by, for example, mobile phones, service modes become diverse, and transmitting large capacity data such as still images and movies in addition to voice data is in demand in recent years.

IMT-2000 cellular system is already in service, and, meanwhile, 3GPP LTE (3GPP Long Term Evolution), which requires a peak rate of 100 Mbps in downlink, is underway to standardize. Then, as a category to aim at further advancement, the standardization of IMT-Advanced is about to start. This IMT-Advanced provides requirement parameters where a rate of several Gps, 100 MHz bandwidth in downlink and a rate of hundreds of Mbps with 40 MHz bandwidth in uplink, that is, this IMT-advanced requires greatly exceeded breakthrough than IMT-2000.

In particular, to use radio resources effectively under situations where uplink and downlink both become wide bands, frequency resource allocation or link adaptation according to frequency response (i.e. the quality per frequency subdivided inside the bands and CQI (Channel Quality Indicator)) is essential. However, in a case of FDD (Frequency Division Duplex) using different frequencies between uplink and downlink, frequency response is different between the uplink band and the downlink band, so that a radio base station apparatus (Node B) and a mobile terminal apparatus (UE) need to transmit, for example, pilot signals to measure the frequency response of each band.

Usually, a pilot signal is necessary for synchronous detection upon data transmission, and the pilot signal for that reason may be transmitted in the band alone where data is transmitted. However, a pilot signal for quality measurement, which is required in frequency resource allocation, needs to be transmitted in the entire band or in a wider band than the data to be transmitted, and furthermore needs to be transmitted whether or not there is data.

Naturally, to measure accurate frequency response, a pilot signal and so on may be transmitted in the entire band, and, if a mobile terminal apparatus transmits a pilot signal in the entire uplink band, there is a drawback of accelerating the battery consumption. Further, when a UE located at a cell boundary transmits a pilot signal in the entire band and great power, interference on surrounding cells increases and uplink throughput of the overall system decreases.

Further, if a pilot signal for CQI measurement is transmitted in a wide band when transmission power is limited to reduce battery consumption, the received power density in the radio base station apparatus decreases, and therefore CQI measurement error increases. Particularly, this affects the UE near a cell boundary remarkably. If the CQIs with measurement error increase is responded, frequency band allocation cannot be carried out properly, and therefore overall uplink throughput in a cell decreases.

The method of reducing power consumption of the mobile terminal apparatuses includes a method of decimating transmission of a pilot signal for CQI measurement in the time domain and the frequency domain. One example is disclosed in Non-patent Document 1. With this method, the bandwidth for transmitting a pilot signal for CQI measurement is controlled according to path loss. To be more specific, the UE that is near the base station apparatus and that has small path loss transmits a pilot signal for CQI measurement in a wide bandwidth, and the UE that is near a cell boundary and that has large path loss transmits a pilot signal for CQI measurement in a narrow bandwidth.

Non-patent Document 1: "Frequency Domain Channel-Dependent Scheduling with Group-wised Allocation of Transmission Bandwidth of Pilot Channel for CQI Measurement in Single-Carrier FDMA-Based Evolved UTRA Uplink" Technical Report of IEICE, RCS2006-154, October, 2006, Ofuji, Kawamura, Higuchi and Sawahashi

DISCLOSURE OF INVENTION

Problems to be Solved by the Invention

However, if a pilot signal is decimated in the time domain and frequency domain on a random basis or automatically and transmitted, tracking for time fluctuation and frequency selectivity is damaged by the decimation. As a result, optimal radio resource allocation is not possible, and, therefore, overall system throughput decreases.

To be more specific, as shown in FIG. 1, there are various problems depending on the methods of decimation. In the figure, the curves that fluctuate significantly show channel quality, the lines fluctuating at low levels show noise and interference, and the oval arcs or rectangular shapes show pilot signals for CQI measurement.

FIG. 1A shows a case where the mobile terminal apparatus transmits a CQI pilot signal in the entire uplink band. In this case, the power for transmitting a CQI pilot signal becomes excessive and heavy load for the mobile terminal apparatus.

FIG. 1B shows a case where the mobile terminal apparatus transmits a pilot signal for CQI measurement in the entire uplink band, but the transmission power is smaller than in the case of FIG. 1A. In this case, the power of a CQI pilot signal is buried in noise power and interference power, and, therefore, accurate quality measurement is not possible.

FIG. 1C shows a case where the mobile terminal apparatus decimates a CQI pilot signal in the frequency domain and transmits the decimated CQI pilot signal. In this case frequency selectivity may not be tracked.

FIG. 1D shows a case where the mobile terminal apparatus transmits a CQI pilot signal in bands limited in the frequency domain. In this case, the CQI pilot signal may not be transmitted in adequate frequencies.

FIG. 1E shows a case where the mobile terminal apparatus decimates a CQI pilot signal in the time domain and transmits the decimated CQI pilot signal. In this case, time variation may not be tracked.

It is therefore an object of the present invention to provide a radio base station apparatus, radio terminal apparatus and radio communication system that can reduce power consumption in the radio terminal apparatus without decimating a pilot signal used to measure uplink channel quality.

Means for Solving the Problem

The radio base station apparatus of the present invention provides a radio base station apparatus in a radio communication system in which different frequency bands are used between uplink and downlink and adopts a configuration including an uplink pilot forming section that forms an uplink pilot signal for communication quality measurement; and a transmission section that transmits the uplink pilot signal for communication quality measurement in a transmission period for the uplink pilot signal for communication quality measurement, using an uplink frequency band for use.

The radio terminal apparatus of the present invention provides a radio terminal apparatus in a radio communication system in which different frequency bands are used between uplink and downlink and adopts a configuration including: a receiving section that receives an uplink pilot signal for communication quality measurement transmitted from a radio base station apparatus in a transmission period for the uplink pilot signal for communication quality measurement using an uplink frequency band for use; an uplink quality measurement section that measures uplink communication quality based on the uplink pilot signal for communication quality measurement; and a reporting section that reports the measured communication quality information to a radio base station apparatus.

The radio communication system of the present invention provide a radio communication system in which different frequency bands are used between uplink and downlink and adopts a configuration including: a radio base station apparatus that includes: a pilot signal forming section that forms an uplink pilot signal for communication quality measurement; a transmission section that transmits the uplink pilot signal for communication quality measurement in a transmission period for the uplink pilot signal for communication quality measurement, using an uplink frequency band for use; and a scheduling section that performs scheduling based on communication quality information measured at a receiving end using the uplink pilot signal for communication quality measurement; and, a radio terminal apparatus that includes: a receiving section that receives the uplink pilot signal for communication quality measurement; an uplink quality measurement section that measures uplink communication quality based on the uplink pilot signal for communication quality measurement; and a reporting section that reports the measured communication quality information to a radio base station apparatus.

Advantages Effect of the Invention

According to the present invention, it is possible to provide a radio base station apparatus, radio terminal apparatus and radio communication system that can reduce power consumption in a radio terminal apparatus without decimating a pilot signal used to measure uplink channel quality.

BRIEF DESCRIPTION OF DRAWINGS

FIG. 1 illustrates an explanation of how to decimate pilot signals for CQI measurement and their decimation problems;

FIG. 9 illustrates operations in the radio communication system of Embodiment 3;

FIG. 10 is an illustration provided to explain the case where transmission of the uplink pilot signals for CQI measurement is not synchronized, by contrast with the operations in the radio communication system of Embodiment 3;

FIG. 23 is an illustration provided to explain relationships between delay spread and frequency selectivity of channel quality.

BEST MODE FOR CARRYING OUT THE INVENTION

Now, embodiments of the present invention will be described in detail with reference to the accompanying drawings.

Embodiment 1

Figure 2:
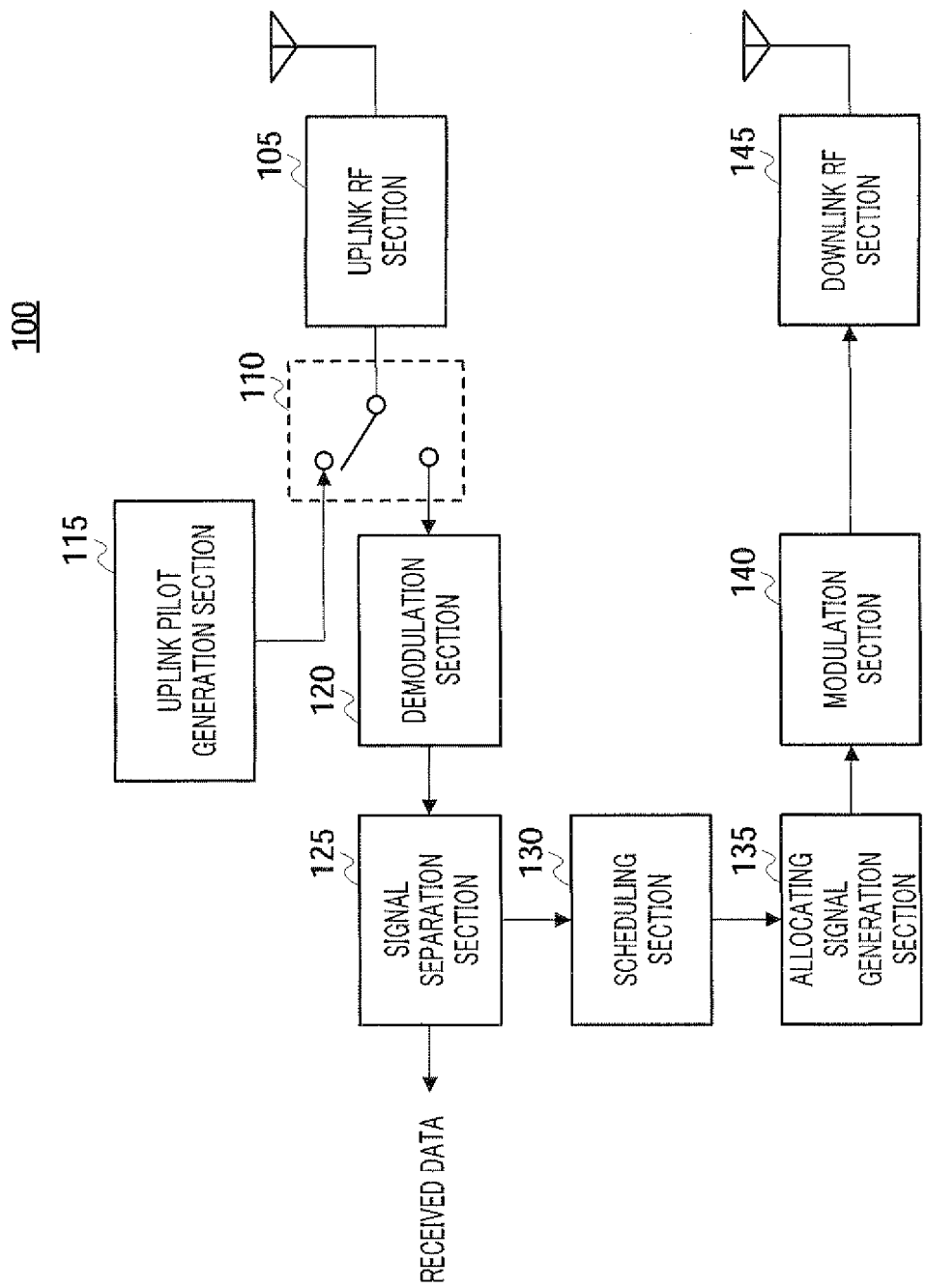
FIG. 2 is a block diagram showing the configuration of the radio base station apparatus according to Embodiment 1 of the present invention.

Referring to FIG. 2, radio base station apparatus 100 in the radio communication system of the present embodiment has uplink RF section 105, transmission/reception switch 110, uplink pilot generation section 115, demodulation section 120, signal separation section 125, scheduling section 130, allocating signal generation section 135, modulation section 140 and downlink RF section 145.

Uplink RF section 105 transmits an uplink pilot signal for CQI measurement in a transmission period for an uplink pilot signal for CQI measurement (hereinafter "uplink pilot transmission period") in the entire frequency band allocated to the uplink. Further, uplink RF section 105 performs radio receiving processing (e.g. down-conversion) on a received signal received via the antenna, and outputs the received signal after the radio receiving processing to demodulation section 120.

Transmission/reception switch 110 switches to the uplink pilot generation section 115 side during the uplink pilot transmission period, to form a conduction state between uplink pilot generation section 115 and uplink RF section 105. As a result, during the uplink pilot transmission period, an uplink pilot signal for CQI measurement formed in uplink pilot generation section 115 is inputted in uplink RF section 105. On the other hand, in time periods other than the uplink pilot transmission period, the frequency bands for uplink is allocated for transmission from mobile terminal apparatus 200 (explained later), and therefore transmission/reception switch 110 switches to the demodulation section 120 side, to form a conduction state between demodulation section 120 and uplink RF section 105. As a result, in the time periods other than the uplink pilot transmission period, the received signal after the radio receiving processing is inputted in demodulation section 120.

Uplink pilot generation section 115 forms an uplink pilot signal for CQI measurement.

Demodulation section 120 demodulates the received signal after the radio receiving processing and outputs the resulting demodulated data to signal separation section 125.

Signal separation section 125 extracts, from the demodulated data, channel quality information measured in mobile terminal apparatus 200 of the receiving end based on the uplink pilot signal for communication quality measurement, and outputs this channel quality information to scheduling section 130.

Scheduling section 130 allocates uplink bands to each mobile terminal apparatus 200 based on the channel quality information from each mobile terminal apparatus 200.

Allocating signal generation section 135 forms an allocating report signal showing the uplink band allocation result in scheduling section 130. Modulation section 140 modulates the allocating report signal and outputs the modulated signal to downlink RF section 145. Downlink RF section 145 performs radio transmission processing on the modulated signal and transmits the signal after the radio transmission processing via the antenna in the downlink frequency band.

Figure 3:
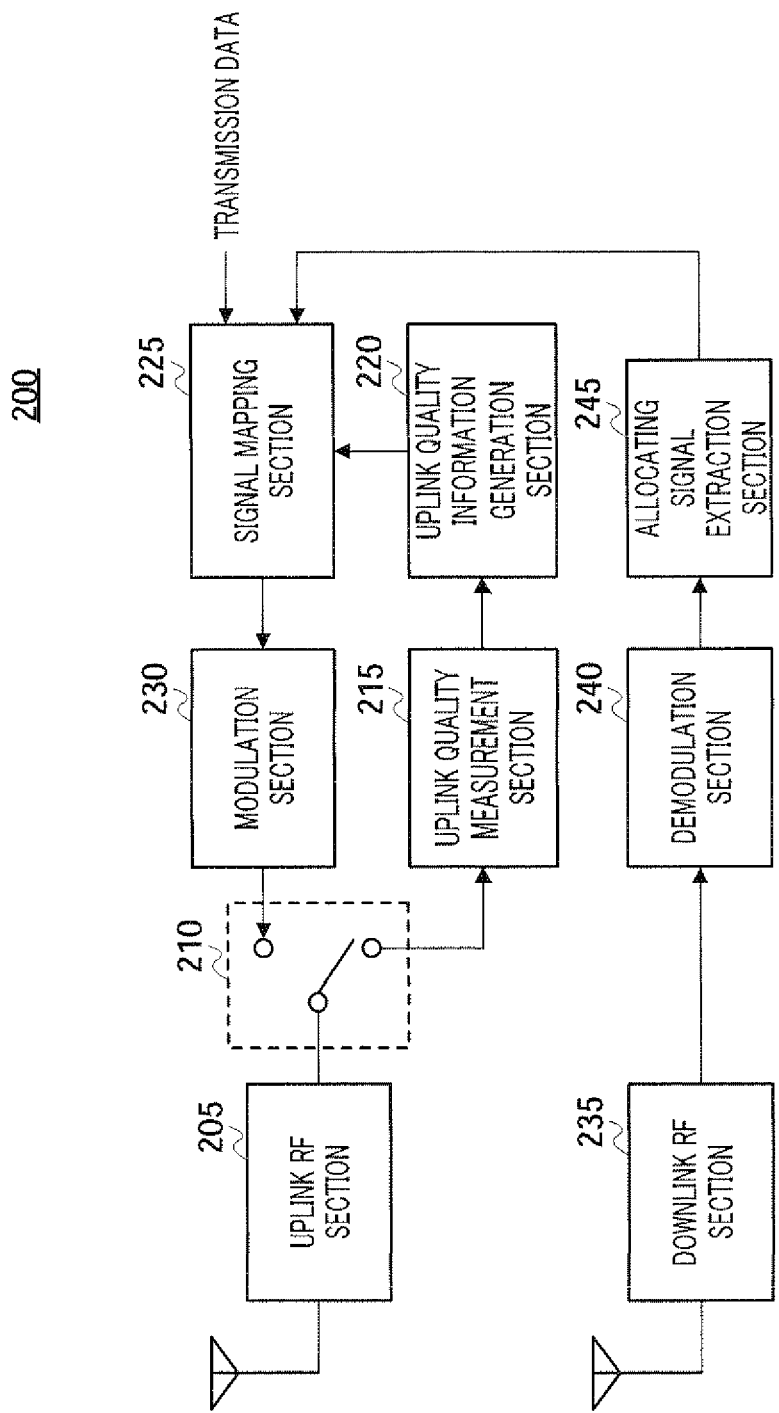
FIG. 3 is a block diagram showing the configuration of the mobile terminal apparatus according to Embodiment 1.

Referring to FIG. 3, mobile terminal apparatus 200 of a radio terminal apparatus in the radio communication system of the present embodiment has uplink RE section 205, transmission/reception switch 210, uplink quality measurement section 215, uplink quality information generation section 220, signal mapping section 225, modulation section 230, downlink RF section 235, demodulation section 240 and allocating signal extraction section 245.

In the "uplink pilot transmission period," uplink RF section 205 receives an uplink pilot signal for CQI measurement in the entire frequency band allocated to the uplink. Further, uplink RF section 205 performs radio transmitting processing (e.g. up-conversion) on a modulated signal from modulation section 230 and transmits the transmission signal after the radio transmitting processing via the antenna.

Transmission/reception switch 210 switches to the uplink quality measurement section 215 side during the uplink pilot transmission period, to form a conduction state between uplink quality measurement section 215 and uplink RF section 205. As a result, in the uplink pilot transmission period, the received uplink pilot signal for CQI measurement is inputted in uplink quality measurement section 215. On the other hand, in time periods other than the uplink pilot transmission period, the frequency band for uplink is allocated for transmission from mobile terminal apparatus 200, and therefore transmission/reception switch 210 switches to the modulation section 230 side, to form a conduction state between modulation section 230 and uplink RF section 205. As a result, for time periods other than the uplink pilot transmission period, the modulated signal from modulation section 230 is inputted in uplink RF section 205.

Uplink quality measurement section 215 measures the channel quality in the uplink bands based on the uplink pilot signal for CQI measurement.

Uplink quality information generation section 220 generates channel quality information to be reported to radio base station apparatus 100 based on the channel quality measured in uplink quality measurement section 215. This channel quality information is received as input to signal mapping section 225.

Signal mapping section 225 maps the channel quality information generated in uplink quality information generation section 220 to a signal to be transmitted in the uplink. Further, signal mapping section 225 maps transmission data to the allocation bands according to the allocating signal from allocating signal extraction section 245.

Modulation section 230 modulates the mapped signal in signal mapping section 225 and outputs the modulated signal to uplink RF section 205.

Downlink RF section 235 performs radio receiving processing (e.g. down-conversion) on a received signal received via the antenna, and outputs the received signal after the radio receiving processing to demodulation section 240. Demodulation section 240 demodulates the signal after the radio receiving processing and outputs the demodulated data to allocating signal extraction section 245. Allocating signal extraction section 245 extracts an allocating signal from the demodulated data, and outputs this allocating signal to signal mapping section 225.

Figure 4:
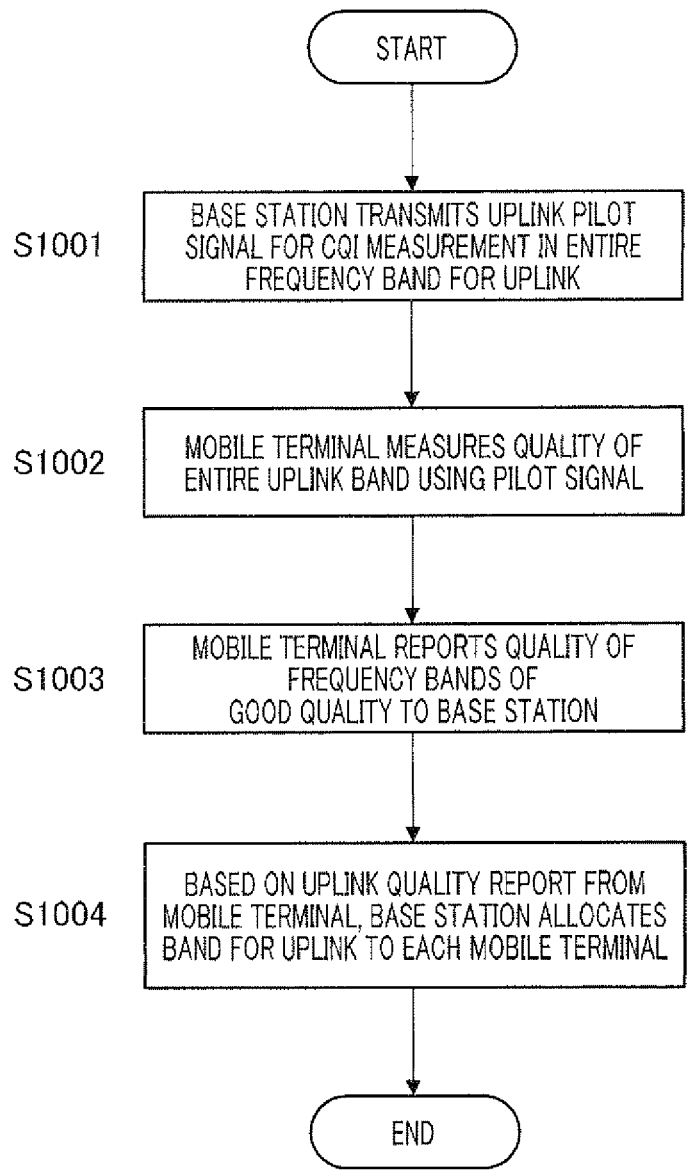
FIG. 4 is a flow chart of operations in the radio communication system of Embodiment 1.

Next, the operations in the radio communication system having the above configuration will be explained using FIGS. 4 and 5.

Figure 5:
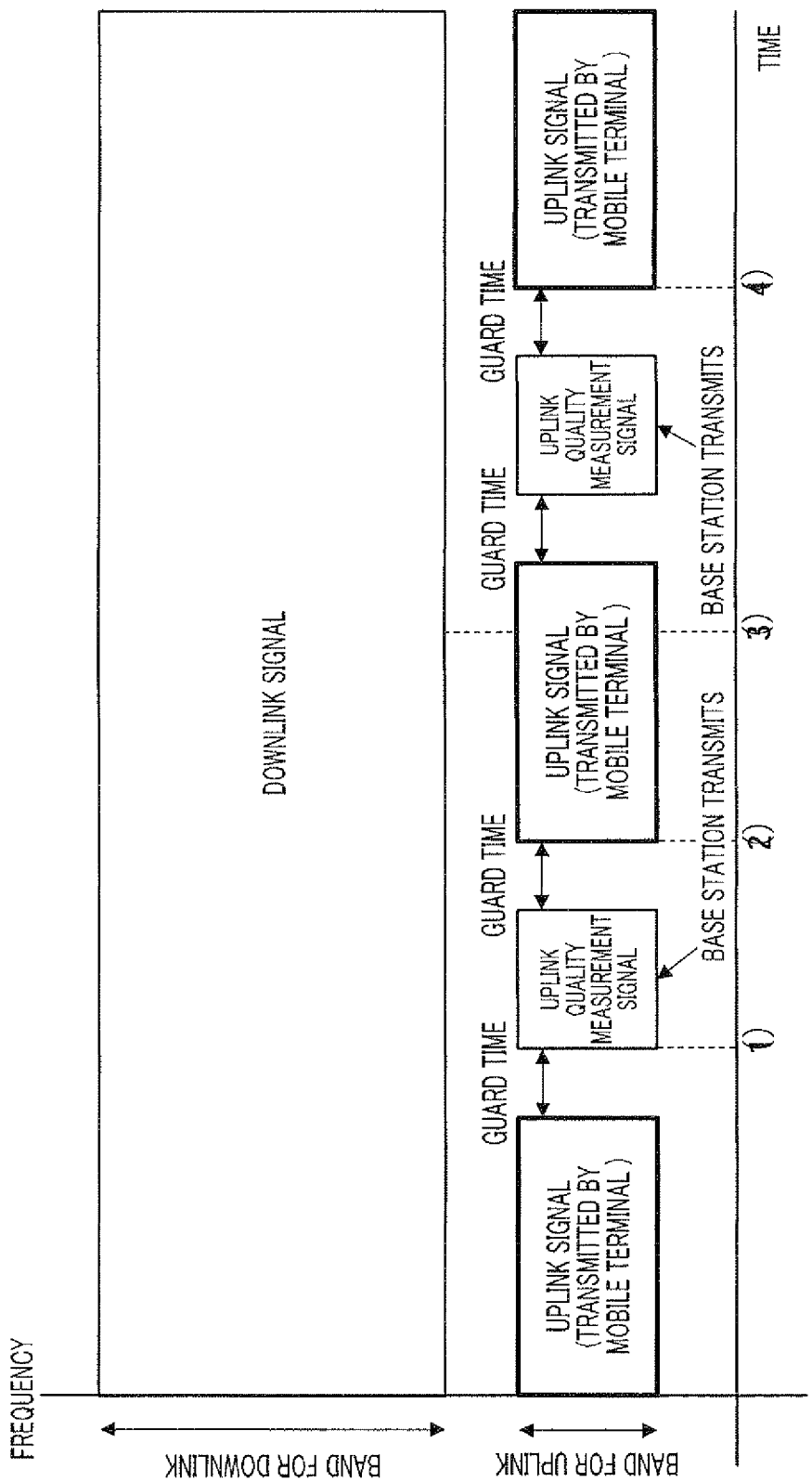
FIG. 5 illustrates operations in the radio communication system of Embodiment 1.

In step 1001 (S1001), radio base station apparatus 100 transmits the uplink pilot signal for CQI measurement in the uplink pilot transmission period in the entire frequency band for uplink (timing 1 in FIG. 5). During the uplink pilot transmission period, all mobile terminal apparatuses 200 in the sector of radio base station apparatus 100 do not perform transmission on the uplink. That is, the transmission of the uplink pilot signal for CQI measurement by radio base station apparatus 100 and transmission of mobile terminal apparatus 200 are divided over time. In a conventional FDD communication system, based on a pilot signal a mobile terminal apparatus transmits, the radio base station apparatus measures uplink channel quality. By contrast with this, radio base station apparatus 100 transmits an uplink pilot signal for CQI measurement used in uplink channel quality measurement, using uplink frequency bands, so that it is possible to reduce power consumption in a mobile terminal apparatus. Further, mobile terminal apparatus 200 transmits channel quality information to radio base station 100 as explained later, but, basically, the channel quality information only includes a measurement result, so that it is possible to reduce power consumption compared to a conventional case where a pilot signal is transmitted for CQI measurement. This is because, the pilot signal needs to be transmitted with significant power so as not to be buried in noise and interference signals upon reception in order to measure quality using the power of the pilot signal itself, but the measurement result can be acquired as information by error correction decoding even if the power upon reception is small in the measurement result. Particularly, in the radio communication system expected to allocate a wide band, for example, 40 MHz to uplink, this effect of reducing power consumption is significant.

Further, in the radio communication system of the present embodiment, a plurality of neighboring radio base station apparatuses 100 transmit an uplink pilot signal for CQI measurement in synchronization. By this means, the radio base station apparatus and the mobile terminal apparatus cancel interference from other cells and sectors, so that it is possible to measure channel quality only arising from the propagation environment that is same between the radio base station apparatus and the mobile station apparatus, that is, measure channel quality reflecting the influence of the propagation environment.

The reason will be explained in detail below. A propagation environment such as multipath only causes to establish reciprocity in quality between uplink and downlink in the case of TDD. Interference signals, which vary depending on locations, vary between the radio base station apparatus and the mobile terminal apparatus. Therefore, when the influence of interference signals remains, it is less likely to establish reciprocity between uplink and downlink in the case of TDD. Then, to establish reciprocity between uplink and downlink in the case of TDD, after cancelling the influence by interference signals, mobile terminal apparatus 200 needs to receive an uplink pilot signal for CQI measurement transmitted in TDD from base station apparatus 100 and measure channel quality. However, unless the timings to transmit the uplink pilot signals for CQI measurement are synchronized between neighboring cells or sectors, mobile terminal apparatus 200 is influenced by interference from other cells and sectors upon receiving the uplink pilot signal for CQI measurement, and therefore, the received quality is alienated from the received quality radio base station apparatus 100 really wants to know. Particularly, this tendency affects mobile terminal apparatus 200 in a cell edge remarkably. Then, to cancel the influence of interference power from other cells and sectors, uplink pilot signals for CQI measurement are transmitted in TDD in synchronization between all cells and all sectors. By this means, it is possible to establish reciprocity in quality between uplink and downlink and then measure quality of the uplink band.

In step 1002 (S1002), mobile terminal apparatus 200 measures the channel quality of the entire uplink band based on the uplink pilot signal for CQI measurement. Further, mobile terminal apparatus 200 generates channel quality information. This channel quality information includes information related to the frequency bands of good quality. These frequency bands may be included in subcarrier units, or in group units where a plurality of neighboring subcarriers are grouped. Further, the number of frequency bands included in channel quality information may be a given number from the best quality, and, it is possible not only to include a specific number, and to include bands exceeding a given threshold value, or bands improved to a certain extent from the previous measurement.

In step 1003 (S1003), mobile terminal apparatus 200 reports the quality of the frequency bands of good quality to radio base station apparatus 100 (timing 2 in FIG. 5). That is, mobile terminal apparatus 200 transmits the channel quality information generated in step 1002 to radio base station apparatus 100.

In step 1004 (S1004), based on channel quality information (uplink quality report) from mobile terminal apparatus 200, radio base station apparatus 100 allocates the bands for the uplink to each mobile terminal apparatus 200 and transmits an allocating signal to each mobile terminal apparatus 200 in the downlink (timing 3 in FIG. 5) After that, mobile terminal apparatus 200 transmits the transmission signal in the uplink using frequency bands according to the allocating signal at timing 4 in FIG. 5. Guard times are provided to periods between the periods where mobile terminal apparatus 200 transmits the uplink signal in the uplink and the periods where radio base station apparatus 100 transmits the uplink pilot signal for CQI measurement in the uplink frequency bands.

The distance between radio base station apparatus 100 and mobile terminal apparatus 200 is not constant because mobile terminal apparatus 200 moves, and therefore, even when the distance is the longest, these guard times are provided such that both periods do not overlap.

In this way, according to the present embodiment, radio base station apparatus 100 in a radio communication system where different frequency bands are used between uplink and downlink, has: uplink pilot generation section 115 for forming an uplink pilot signal for communication quality measurement (in the present embodiment, uplink pilot signal for CQI measurement); and uplink RF section 105, which is a transmission means for transmitting an uplink pilot signal for communication quality measurement in an "uplink pilot transmission period" using uplink frequency bands for use.

By this means, radio base station apparatus 100 transmits an uplink pilot signal for communication quality measurement used in uplink quality measurement, using uplink frequency bands, so that it is possible to reduce power consumption in a mobile terminal apparatus.

Uplink RF section 105 transmits an uplink pilot signal for communication quality measurement in synchronization with other radio base station apparatuses in the radio communication system.

By this means, interference from other different cells and sectors is cancelled, so that it is possible to measure channel quality only arising from a propagation environment, that is, measure channel quality reflecting the influence of the propagation environment.

Further, according to the present embodiment, radio terminal apparatus 200 in a radio communication system where different frequency bands are used between uplink and downlink, has: uplink RF section 205 for receiving an uplink pilot signal for communication quality measurement (in the present embodiment, uplink pilot signal for CQI measurement) transmitted from radio base station apparatus 100 in an "uplink pilot transmission period" using the uplink frequency bands for use; uplink quality measurement section 215 for measuring uplink communication quality (channel quality) based on the uplink pilot signal for communication quality measurement; and uplink quality information generation section 220, which is a reporting means for reporting measured communication quality information to radio base station apparatus 100.

By this means, mobile terminal apparatus 200 transmits communication quality information to radio base station apparatus 100, but, basically, the communication quality information only includes a measurement result, so that it is possible to reduce power consumption compared to a conventional case where a pilot signal is transmitted to measure the CQI.

Embodiment 2

In Embodiment 1, the radio base station apparatus transmits the pilot signal for CQI measurement to use for uplink channel quality measurement over the uplink pilot transmission period, and the mobile terminal apparatus measures uplink channel quality using the pilot signal for CQI measurement. With Embodiment 2, between an uplink pilot transmission period and another uplink pilot transmission period that is closest in time with this uplink pilot transmission period, a "mobile terminal uplink pilot transmission period" during which the mobile terminal apparatus transmits a pilot signal for CQI measurement only in frequency bands where channel quality the mobile terminal apparatus measures is equal to or better than a predetermined level, is further provided. By this means, due to guard times that need to be provided because the radio base station apparatus transmits uplink pilot signals for CQI measurement, the loss of uplink use efficiency is reduced. Furthermore, by providing the "mobile terminal uplink pilot transmission periods," it is possible to make the longer time intervals between the uplink pilot transmission periods than in Embodiment 1. For example, although, with Embodiment 1, the radio base station apparatus transmits a pilot signal for CQI measurement every frame, with Embodiment 2 it is also possible to transmit a pilot signal for CQI-measurement only once every several tens of frames. Furthermore, the pilot signal for CQI measurement is transmitted during the "mobile terminal uplink pilot transmission period" only in frequency bands where channel quality measured by the mobile terminal apparatus is equal to or better than a predetermined level, so that it is possible to adequately select frequency bands that are likely to be allocated, and transmit a pilot signal for CQI measurement, compared to the case of transmitting decimated pilot signals for CQI measurement in a mechanical manner or on a random basis, thereby improving system efficiency by frequency allocation.

Figure 6:
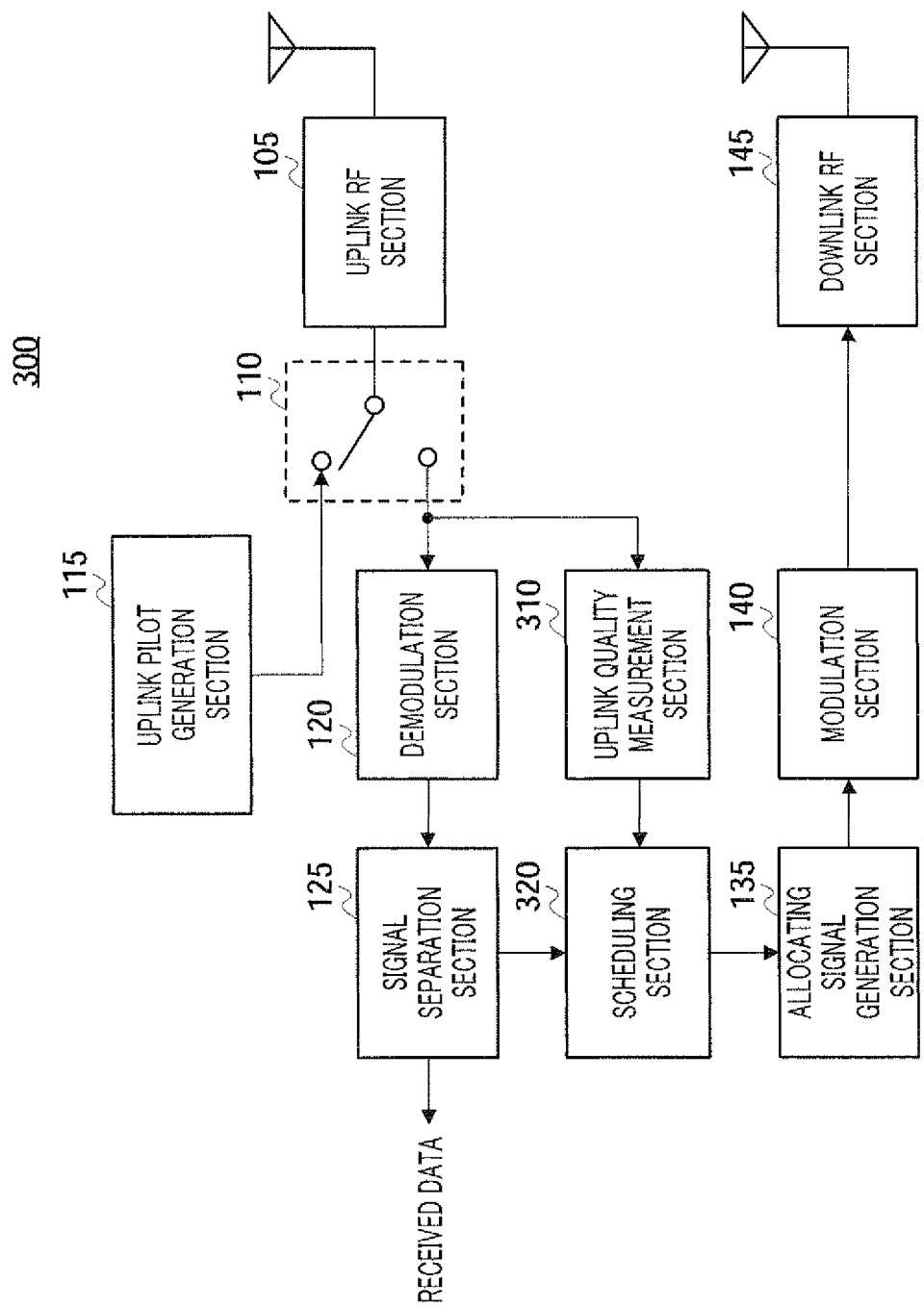
FIG. 6 is a block diagram showing the configuration of the radio base station apparatus according to Embodiment 2.

Referring to FIG. 6, radio base station apparatus 300 in the radio communication system with the present embodiment has uplink quality measurement section 310 and scheduling section 320.

Uplink quality measurement section 310 measures the uplink channel quality based on the uplink pilot signal for CQI measurement transmitted from mobile terminal apparatus 400 (described later) in the "mobile terminal uplink pilot transmission period." As described later, mobile terminal apparatus 400 does not use the entire uplink band and transmits the uplink pilot signal for CQI measurement to the base station apparatus only in the frequency bands where channel quality is equal or better than the predetermined level. Therefore, uplink quality measurement section 310 measures channel quality only in the frequency bands where the uplink pilot signals for CQI measurement are superimposed.

Based on the channel quality measured in uplink quality measurement section 310, scheduling section 320 allocates the bands for use to mobile terminal apparatus 200 (or performs link adaptation), amongst frequency bands where the channel quality is measured.

Figure 7:
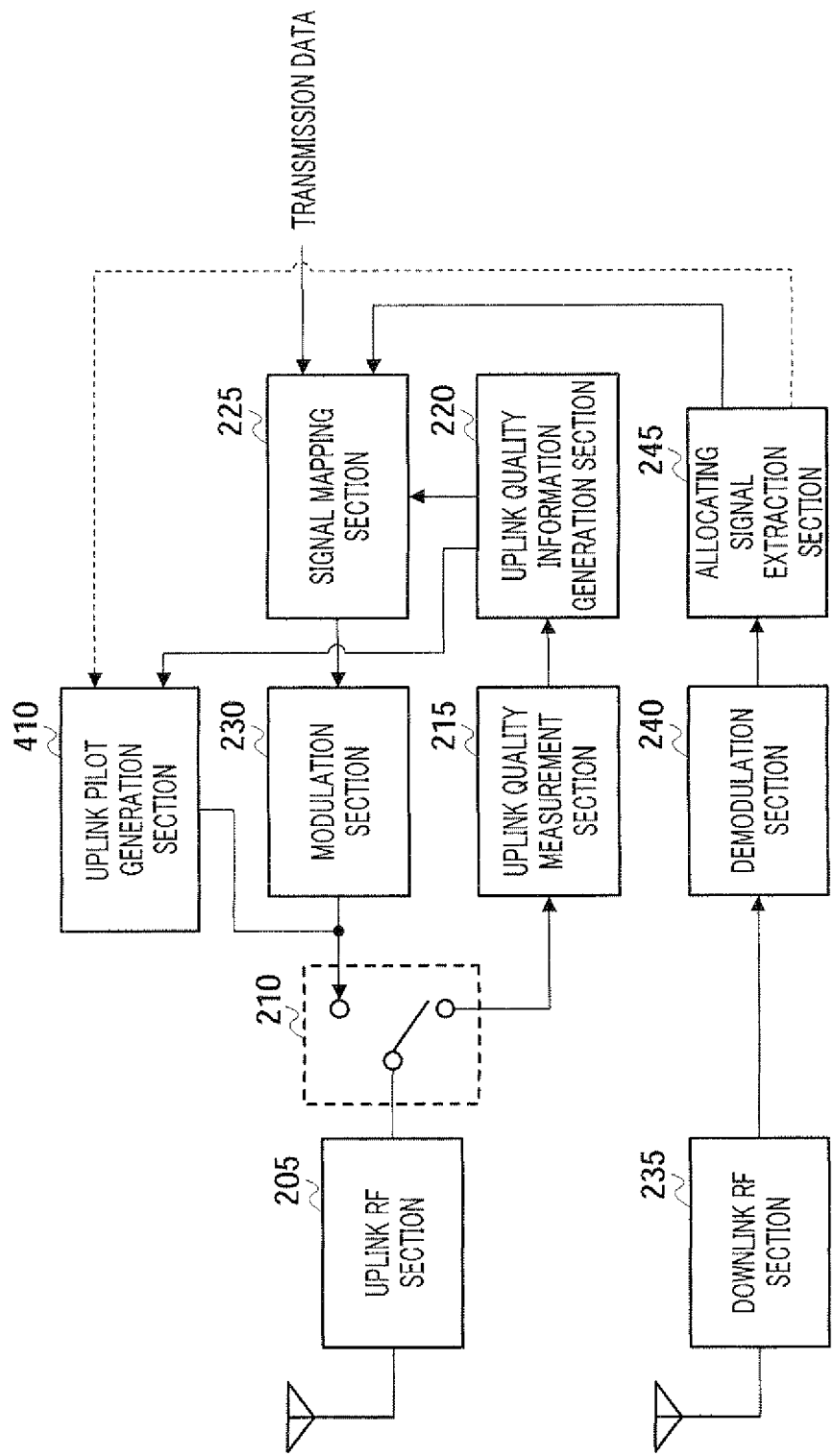
FIG. 7 is a block diagram showing the configuration of the mobile terminal apparatus according to Embodiment 2.

Referring to FIG. 7, mobile terminal apparatus 400 in the radio communication system with the present embodiment has uplink pilot generation section 410.

Uplink pilot generation section 410 receives as input the channel quality information generated in uplink quality information generation section 220 in the "mobile terminal uplink pilot transmission period," and outputs the uplink pilot signal for CQI measurement and the channel quality information generated triggered by this input, to uplink RF section 205.

Uplink RF section 205 transmits the uplink pilot signal for CQI measurement only in the frequency bands where channel quality information is equal or better than the predetermined level.

The operations of the radio communication system having the above configuration with the present embodiment will be explained with reference to FIG. 8.

Figure 8:
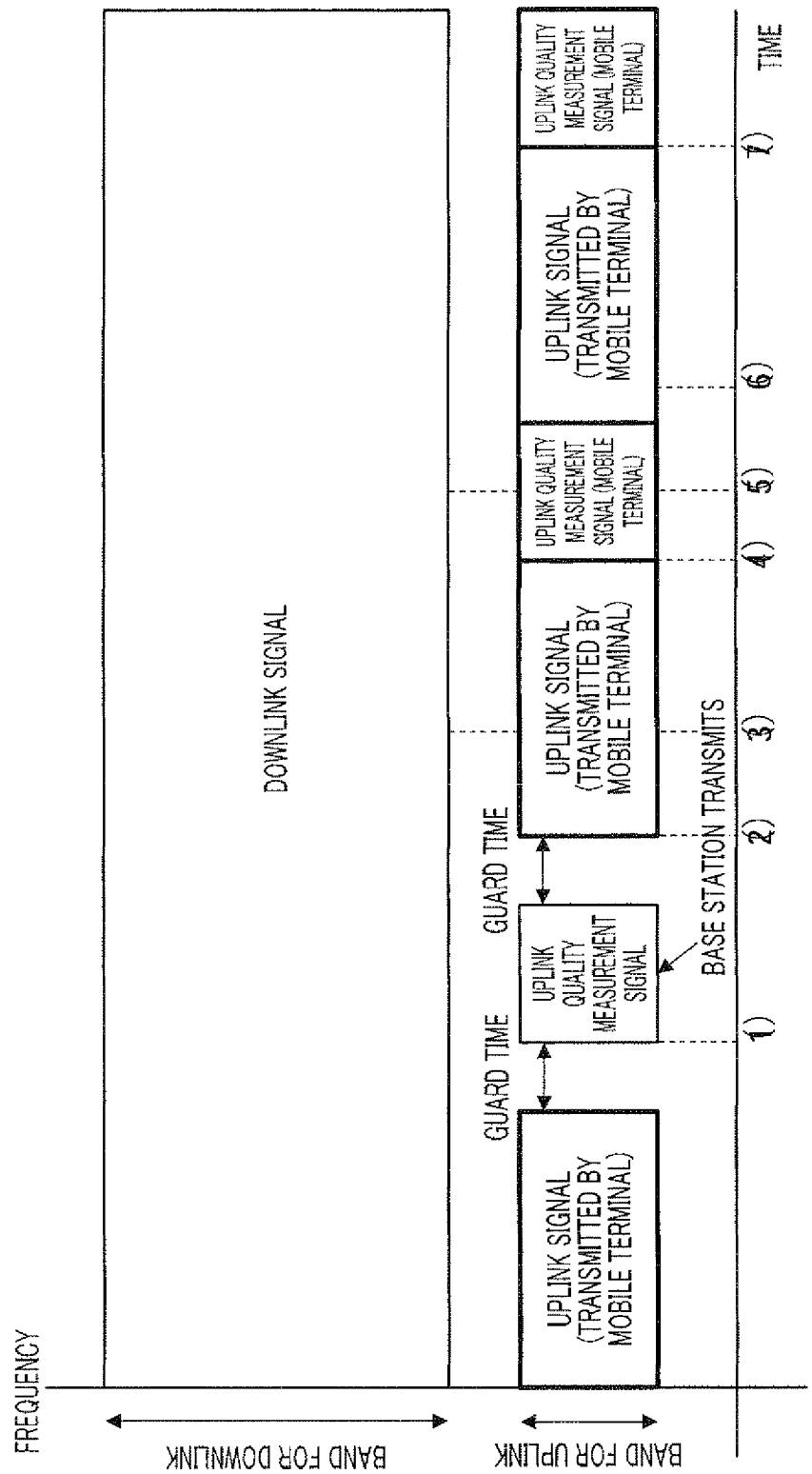
FIG. 8 illustrates operations in the radio communication system of Embodiment 2.

First, the processing at timings 1 to 3 in FIG. 8 is as same as in FIG. 5. That is, radio base station apparatus 300 transmits the uplink pilot signal for CQI measurement in the uplink pilot transmission period in the entire frequency band for uplink. Then, mobile terminal apparatus 400 measures the channel quality of the entire uplink band based on the uplink pilot signal for CQI measurement. Further, mobile terminal apparatus 400 generates channel quality information.

At timing 2, mobile terminal apparatus 400 reports the quality of frequency bands of good quality to radio base station apparatus 300.

At timing 3, based on the channel quality information (uplink quality report) from mobile terminal apparatus 400, radio base station apparatus 300 allocates the bands for the uplink to each mobile terminal apparatus 400 and transmits an allocating signal to each mobile terminal apparatus 400 in downlink.

The present embodiment is different from Embodiment 1 in the following flow.

At timing 4, a "mobile terminal uplink pilot transmission period" is provided, and mobile terminal apparatus 400 transmits the uplink pilot signal for CQI measurement only in the frequency bands where channel quality information is equal to or better than a predetermined level. Further, mobile terminal apparatus 400 may transmit an uplink signal not including the uplink pilot signal for CQI measurement in the frequency bands according to the allocating signal transmitted from radio base station apparatus 300. Here, mobile terminal apparatus 400 transmits the uplink pilot signal for CQI measurement in part of the band narrowed down from the entire uplink band, in other words, mobile terminal apparatus 400 checks the entire uplink band based on the uplink pilot signal for CQI measurement once transmitted from radio base station apparatus 300 in the entire uplink band and then narrows down part of the band. For this reason, even if an uplink pilot signal for CQI measurement is not transmitted from mobile terminal apparatus 400 in the entire band, radio base station apparatus 300 can allocate frequencies adequately. Although the power mobile terminal apparatus 300 consumes to transmit an uplink pilot signal for CQI measurement increases compared to Embodiment 1, an uplink pilot signal for CQI measurement is transmitted in bands likely to be allocated by radio base station apparatus 300 because the quality is good, so that there is little loss in transmission of an uplink pilot signal for CQI measurement. It is needless to say that power consumption of the mobile terminal apparatus can be reduced compared to a conventional case where a mobile terminal apparatus transmits an uplink pilot signal for CQI measurement in the entire uplink band.

At timing 5, radio base station apparatus 300 measures the uplink channel quality based on the uplink pilot signal for CQI measurement transmitted from mobile terminal apparatus 400 in the "mobile terminal uplink pilot transmission period." Then, based on the measured channel quality, radio base station apparatus 300 allocates (or performs link adaptation) bands for use amongst the frequency bands where channel quality is measured, to mobile terminal apparatus 200, and transmits the allocating signal (or commands link adaptation) to mobile terminal apparatus 400 using downlink.

At timing 6, mobile terminal apparatus 400 transmits the uplink signal in the frequency bands according to the allocating signal (or link adaptation command) from radio base station apparatus 300.

At timing 7, mobile terminal apparatus 400 retransmits the uplink pilot signal for CQI measurement only in the frequency bands where channel quality information is equal to or better than a predetermined level. That is, the processing of timings 4 to 6 is repeated a predetermined number of times and the process returns to timing 1 in the next uplink pilot transmission period. The periods between the periods in which mobile terminal apparatus 400 transmits an uplink signal and the "mobile terminal uplink pilot transmission periods" are periods of transmission by mobile terminal apparatus 400, and therefore it is not necessary to provide a guard time. For that reason, it is possible to reduce loss of uplink use efficiency. Further, between the uplink pilot transmission period and another uplink pilot transmission period that is the closest in time to this uplink pilot transmission period, the "mobile terminal uplink pilot transmission period," during which the mobile terminal apparatus transmits a pilot signal for CQI measurement only in frequency bands where channel quality measured by the mobile terminal apparatus is equal to or better than a predetermined level, is provided, so that, an uplink pilot signal for CQI measurement is transmitted in good frequency bands even if the time interval between the uplink pilot transmission periods is made longer, thereby allowing radio base station apparatus 300 to perform scheduling adequately. By the way, even if transmission timings of mobile terminal apparatus 400 are aligned precisely, this alone does not eliminate the guard times. This is because, the distances between the radio base station apparatus and the mobile terminal apparatuses vary and the propagation times are different, and, therefore, the guard times are necessary for cancelling the propagation time differences to make sure that own transmission signals of the base station apparatus and the mobile terminal apparatuses do not interfere with a own received signal. However, by implementation in the present embodiment, it is possible to reduce the amount of guard times.

With the above explanation, mobile terminal apparatus 400 measures uplink channel quality based on an uplink pilot signal for CQI measurement transmitted from radio base station apparatus 300, and superimposes uplink pilot signals for CQI measurement in an autonomous manner in the frequency bands where measurement channel quality measured is equal to or better than a predetermined level, and transmits the superimposed uplink pilot signals for CQI measurement. However, the present invention is not limited to this, and, mobile terminal apparatus 400 may transmit the uplink pilot signals for CQI measurement following a command from radio base station apparatus 300.

In this case, in the stage of receiving channel quality information from mobile terminal apparatus 400 (equivalent to timing 3 in FIG. 8), scheduling section 320 determines the frequency bands that mobile terminal apparatus 400 uses to transmit an uplink pilot signal for CQI measurement in the "mobile terminal uplink pilot transmission period." The criteria for these frequency bands may be that the channel quality information in these bands is equal to or better than a predetermined level. Further, the determined frequency bands may be subcarrier units, or group units where a plurality of neighboring subcarriers are grouped. Further, the number of frequency bands included in the channel quality information may be a given number from the best quality, and, it is possible not only to include a specific number, and to include bands exceeding a given threshold value, or bands improved to a certain extent from the previous measurement. The frequency bands according to this determination cover the frequency bands according to the allocating signal.

Next, allocating signal generation section 135 generates frequency band information determined in scheduling section 320, and the frequency band information is transmitted via modulation section 140 and downlink RF section 145.

Then, in mobile terminal apparatus 400, allocating signal extraction section 245 extracts the frequency band information, and outputs the extracted frequency band information to uplink pilot generation section 410 (corresponding to the dotted arrow in FIG. 7) Uplink pilot generation section 410 receives as input the channel quality information in the "mobile terminal uplink pilot transmission period," and outputs the uplink pilot signal for CQI measurement and the channel quality information generated triggered by this input, to uplink RF section 205. Uplink RF section 205 transmits the uplink pilot signal for CQI measurement only in the frequency bands shown by the channel quality information.

Furthermore, although a case has been explained above where uplink REF section 205 adjusts the frequency bands in which uplink pilot signals for CQI measurement is superimposed, the present invention is not limited to this, and modulation section 230 or signal mapping section 225 may receive an uplink pilot signal as input and adjust the frequency bands where uplink pilot signals for CQI measurement are superimposed, as long as mobile terminal apparatus 400 may transmit an uplink pilot signal for CQI measurement only in the bands where channel quality is equal to or better than a predetermined level.

In this way, according to the present embodiment, radio base station apparatus 300 has: scheduling section 320 for acquiring communication quality information measured at the receiving end (mobile terminal apparatus 400) based on an uplink pilot signal for communication quality measurement (in the present embodiment, uplink pilot signal for CQI measurement); and uplink quality measurement section 310 for measuring uplink communication quality (channel quality) only for an uplink pilot signal for communication quality measurement transmitted from the receiving end (mobile terminal apparatus 400) in bands where the communication quality information shows equal or better communication quality than a predetermined level.

By this means, the radio base station apparatus is able to acquire communication quality information measured at the receiving end using the uplink pilot signal for communication quality measurement transmitted in uplink bands, so that it is possible to allocate adequate uplink bands. Further, uplink communication quality (channel quality) is measured only with the uplink pilot signal for communication quality measurement transmitted from the receiving end (mobile terminal apparatus 400) in bands where communication quality information shows equal or better communication quality than a predetermined level, so that it is possible to prevent useless communication quality measurement in bands that are little likely to be allocated. Further, by the measurement result of communication quality in the part of these bands, band assignment can be performed in bands of good quality, so that it is possible to perform efficient band allocation processing.

Further, according to the present embodiment, radio terminal apparatus 400 has: uplink pilot generation section for forming an uplink pilot signal for communication quality measurement; and uplink RF section 205 for transmitting the uplink pilot signal for communication quality measurement only in bands where communication quality information shows equal or better communication quality than a predetermined level.

By this means, an uplink pilot signal for CQI measurement is transmitted in the bands likely to be allocated by radio base station apparatus 300 because the quality is good, so that there is little loss in transmission of an uplink pilot signal for CQI measurement, thereby allowing the mobile terminal apparatus to reduce power consumption, compared to a conventional case where a mobile terminal apparatus transmits an uplink pilot signal for CQI measurement in entire uplink band.

Embodiment 3

Embodiment 3 is related to an embodiment where there are a plurality of divided frequency bands for use that are divided in the frequency domain in an uplink frequency band for use. The present embodiment is applicable to Embodiments 1 and 2, and therefore will be explained with reference to FIGS. 2, 3, 9 and 10 in the case where the present embodiment applies to Embodiment 1.

Uplink RF section 105 transmits uplink pilot signals for CQI measurement in synchronization with all of a plurality of divided frequency bands for use. That is, as shown in FIG. 9A, the timing mobile terminal apparatus 200 transmits an uplink signal and the timing radio base station apparatus 100 transmits an uplink pilot signal for CQI measurement are synchronized in a plurality of divided frequency bands for use. Although a case is shown in FIG. 9 where uplink band A and uplink band B are provided as a plurality of divided frequency bands for use, the number of divided frequency bands for use is not limited to this.

FIG. 9B shows a situation of received power in mobile terminal apparatus 200 at timing 1 shown in FIG. 9A, and FIG. 9C shows a situation of received power in radio base station apparatus 100 at the same timing.

Timing 1 shows a timing mobile terminal apparatus 200 transmits uplink signals, as evident from FIG. 9B, uplink RF section 105 synchronizes all of a plurality of divided frequency bands for use and transmits uplink pilot signals for CQI measurement, and therefore the transmission signals are not buried in transmission signals in neighboring divided frequency bands for use, even if there is power leakage (i.e. the leakage parts from the edges of divided frequency bands in the figure) having influence on each transmission signal. Consequently, as evident from the situation of received power in radio base station apparatus 100 of the receiving end of uplink pilot signals for CQI measurement shown in FIG. 9C, the uplink pilot signals for CQI measurement transmitted in the divided frequency bands for use can be separated. The reason that the reception power in radio base station apparatus 100 is smaller than the reception power in mobile terminal apparatus 200 is that the reception power is attenuated over the propagation path.

Meanwhile, FIG. 10 shows a case where transmission of uplink pilot signals for CQI measurement is not synchronized in a plurality of divided frequency bands for use.

At timing 1 in FIG. 10A, radio base station apparatus 100 transmits the uplink pilot signal for CQI measurement in uplink band A, and mobile terminal apparatus 200 transmits the uplink signal in uplink band B.

FIG. 10B shows a situation of received power in mobile terminal apparatus 200 at timing 1 shown in FIG. 10A, and FIG. 10C shows a situation of received power in radio base station apparatus 100 at the same timing.

As shown in FIG. 10B, mobile terminal apparatus 200 receives the uplink pilot signal for CQI measurement transmitted in uplink band A, but cannot separate the uplink pilot signal for CQI measurement well because the received uplink pilot signal for CQI measurement is buried in power leakage of the uplink signal the mobile terminal apparatus transmits. Further, the same occurs to radio base station apparatus 100 as evident from FIG. 10C. That is, if transmission and reception are not synchronized between neighboring divided frequency bands for use, power of the signal the apparatus transmits makes a significant interference signal against received signals in the neighboring divided use frequency bands, and, consequently, the reception characteristics deteriorate. To prevent interference from these neighboring divided frequency bands for use by guard bands, wide guard bands are necessary, and, as a result, the efficiency of frequency use decreases.

In this way, according to the present embodiment, by synchronizing all of a plurality of divided frequency bands for use and by transmitting uplink pilot signals for CQI measurement, it is possible to reduce interference between neighboring divided frequency bands for use. Further, guard bands can be smaller, so that frequency use efficiency can improve.

Embodiment 4

With Embodiment 1, the radio base station apparatus transmits an uplink pilot signal for communication quality measurement in an "uplink pilot transmission period" using uplink frequency bands for use. By contrast with this, with the present embodiment, the radio base station apparatus transmits information data together with an uplink pilot signal for communication quality measurement in the transmission period.

Figure 11:
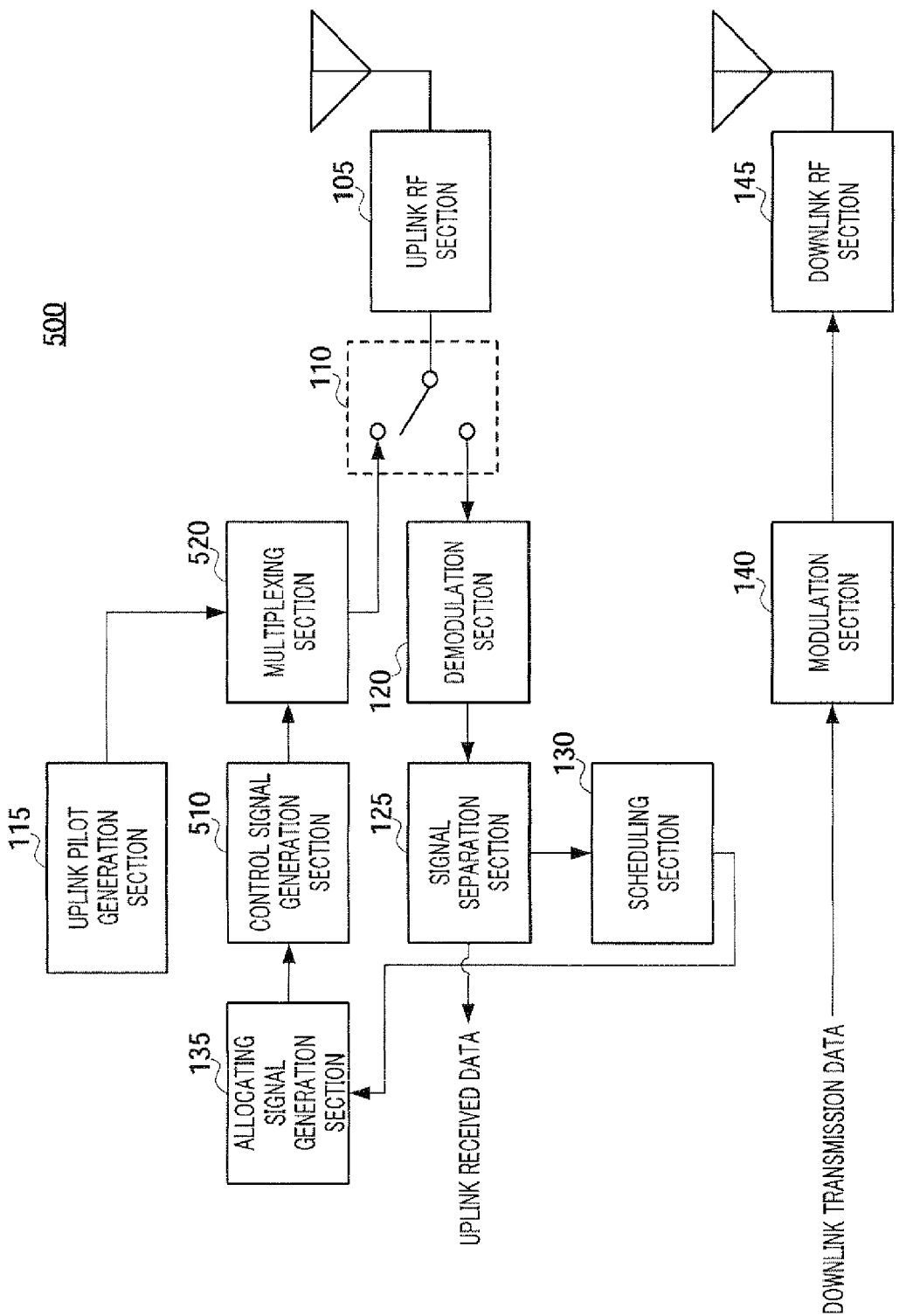
FIG. 11 is a block diagram showing the configuration of the radio base station apparatus according to Embodiment 4.

As shown in FIG. 11, radio base station apparatus 500 in the radio communication system with the present embodiment has control signal generation section 510 and multiplexing section 520.

Control signal generation section 510 generates a control signal including an allocating report signal formed in allocating signal generation section 135.

Multiplexing section 520 multiplexes the control signal generated in control signal generation section 510 and an uplink pilot signal for CQI measurement formed in uplink pilot generation section 115, to form a multiplexed signal. Multiplexing section 520 is connected to transmission/reception switch 110. During the uplink pilot transmission period, multiplexing section 520 and uplink RF section 105 are in a conduction state.

Figure 12:
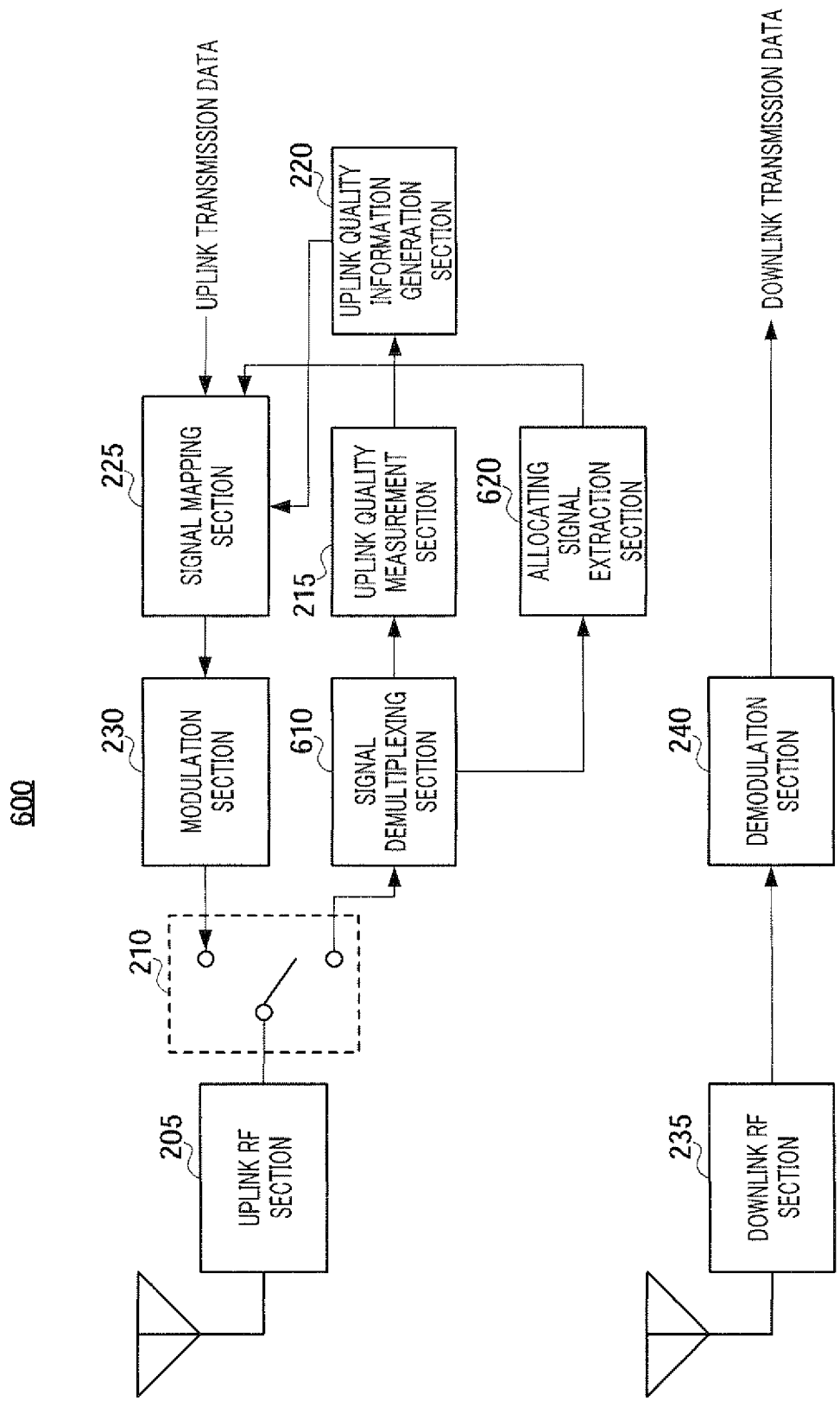
FIG. 12 is a block diagram showing the configuration of the mobile terminal apparatus according to Embodiment 4.

As shown in FIG. 12, the mobile terminal apparatus 600 in the radio communication system with the present embodiment has signal demultiplexing section 610 and allocating signal extraction section 620.

Signal demultiplexing section 610 is connected to transmission/reception switch 210. During the uplink pilot transmission period, signal demultiplexing section 610 and uplink RF section 205 are in a conduction state. Signal demultiplexing section 610 demultiplexes a signal after radio receiving processing in uplink RF section 205 into an uplink pilot signal for CQI measurement and other signals. The uplink pilot signal for CQI measurement acquired by this demultiplexing is outputted to uplink quality measurement section 215, and, meanwhile, other signals are outputted to allocating signal extraction section 620.

Allocating signal extraction section 620 extracts a control signal (allocating report signal in particular here) and outputs the acquired control signal to signal mapping section 225.

Figure 13:
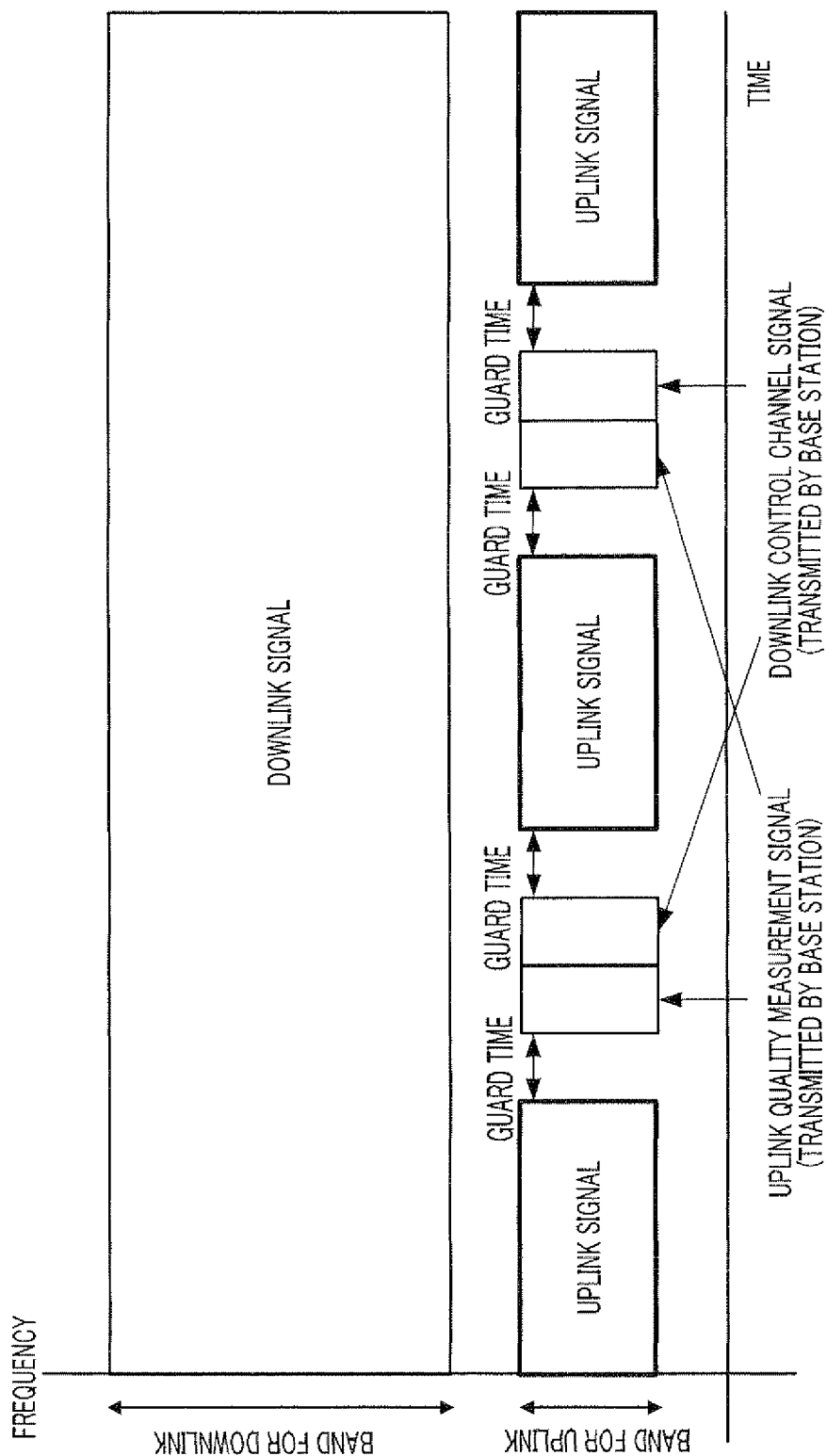
FIG. 13 is an illustration provided to explain communication carried out in the radio communication system in Embodiment 4.

Next, FIG. 13 shows a situation of communication carried out in the radio communication system having the above configuration.

As shown in the figure, during the uplink pilot transmission period, radio base station apparatus 500 transmits a control signal generated in control signal generation section 510 together with an uplink pilot signal for CQI measurement formed in uplink pilot generation section 115. At this time, the uplink pilot signal for CQI measurement and the control signal are time-division multiplexed and transmitted. Further, both the uplink pilot signal for CQI measurement and the control signal are transmitted from radio base station apparatus 500, so that it is not necessary to provide a guard time to the boundary between the periods in which the both signals are transmitted.

Here, if the uplink pilot signal for CQI measurement alone is transmitted in the uplink pilot transmission period, it is necessary to add the length of time suitable for a cell radius, as the guard times, before and after the uplink pilot transmission period, even when the pilot itself is transmitted in a short time period. For this reason, loss in guard times relatively increases, and therefore frequency use efficiency decreases.

On the other hand, as the present embodiment, radio base station apparatus 500 transmits a control signal in addition to an uplink pilot signal for CQI measurement at the same time in the uplink pilot transmission period, so that it is possible to reduce a rate of guard times in the uplink. This results in improving the efficiency of uplink communication further, compared to Embodiment 1.

Although a case has been explained above where the allocating report signal is included in the control signal, the present invention is not limited to this, and, for example, MCS information and an ACK and/or NACK for a packet transmitted from mobile terminal apparatus 600 to radio base station apparatus 500 may be included.

Further, by matching the bands where radio base station apparatus 500 transmits the ACK and/or NACK and the bands where mobile terminal apparatus 600 transmits a packet, it is not necessary to transmit the packet number from radio base station apparatus 500 to mobile terminal apparatus 600, so that it is possible to reduce the overhead.

Further, the signal transmitted together with the uplink pilot signal for communication quality measurement is not limited to the control signal, and, for example, may be a broadcast channel (BCH) signal, a multicast/broadcast signal, or individual user data.

Although a case has been explained above where all downlink control signals are transmitted in uplink band, the present invention is not limited to this, and part of downlink control signals may be transmitted in downlink band depending on, for example, the kinds of control signals.

Embodiment 5

With Embodiment 1, the mobile terminal apparatus reports communication quality information to the radio base station apparatus using all of the bands where the radio base station apparatus has transmitted uplink pilot signals for CQI measurement. By contrast with this, with the present embodiment, the mobile terminal apparatus reports the bands where channel quality is equal to or better than a predetermined level amongst the bands where the radio base station apparatus has transmitted uplink pilot signals for CQI measurement, as communication quality information, to the radio base station apparatus. To be more specific, by transmitting a random access channel (RACH) signal in bands where the uplink communication quality is equal to or better than a predetermined level, the mobile terminal apparatus reports the bands to the radio base station apparatus.

Figure 14:
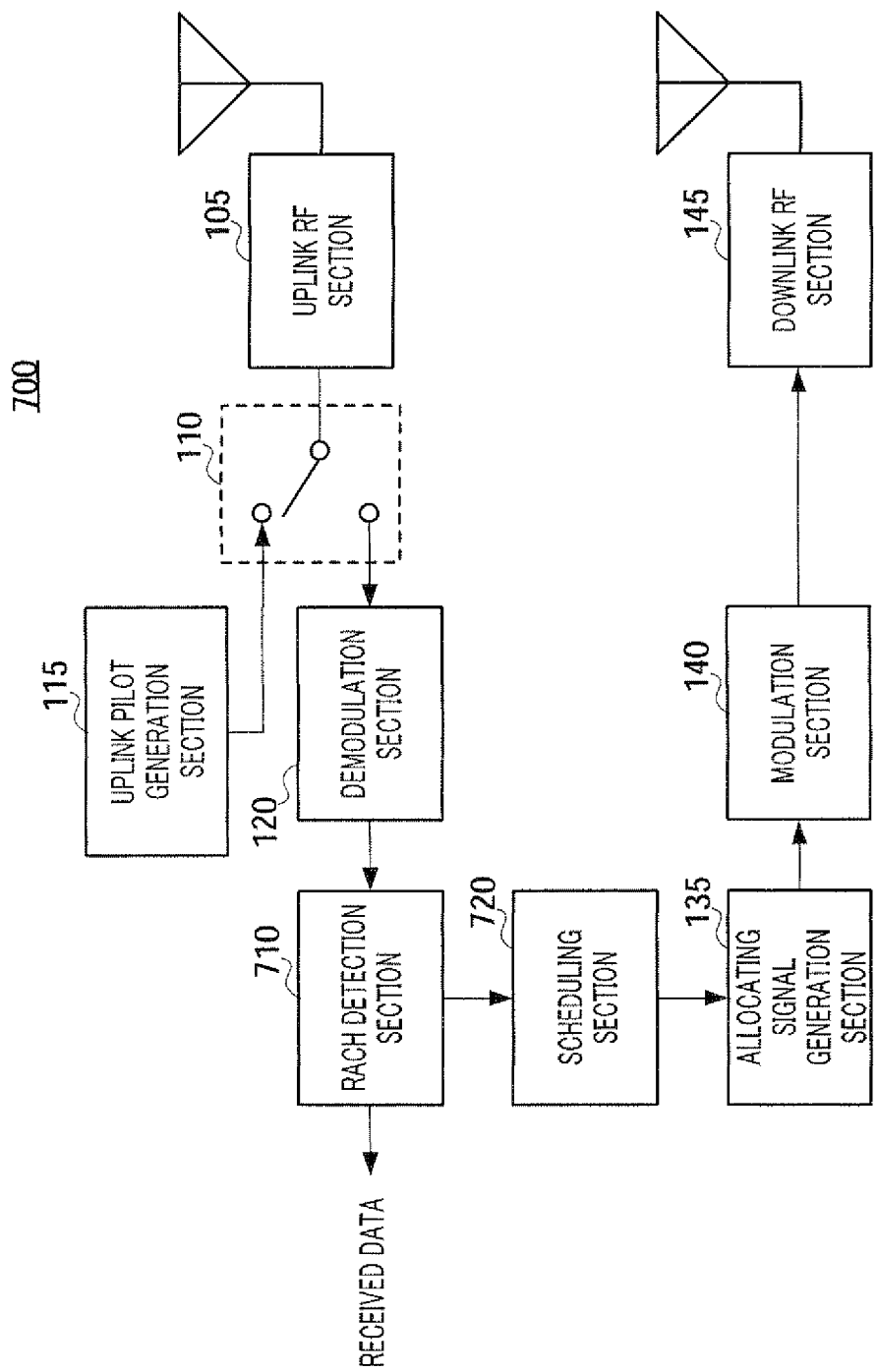
FIG. 14 is a block diagram showing the configuration of the radio base station apparatus according to Embodiment 5.

Referring to FIG. 14, radio base station apparatus 700 in the radio communication system of the present embodiment has RACH detection section 710 and scheduling section 720.

RACH detection section 710 detects a RACH signal based on demodulated data. RACH detection section 710 outputs the information related to the bands where the RACH signal is detected and the channel quality information included in the RACH signal, to scheduling section 720.

When the RACH signal is detected, scheduling section 720 transmits an ACK to the mobile terminal apparatus having transmitted the RACH signal. Further, based on the channel quality information, scheduling section 720 allocates uplink bands amongst the bands where the RACH signal is detected, to the mobile terminal apparatus having transmitted the RACH signal.

Figure 15:
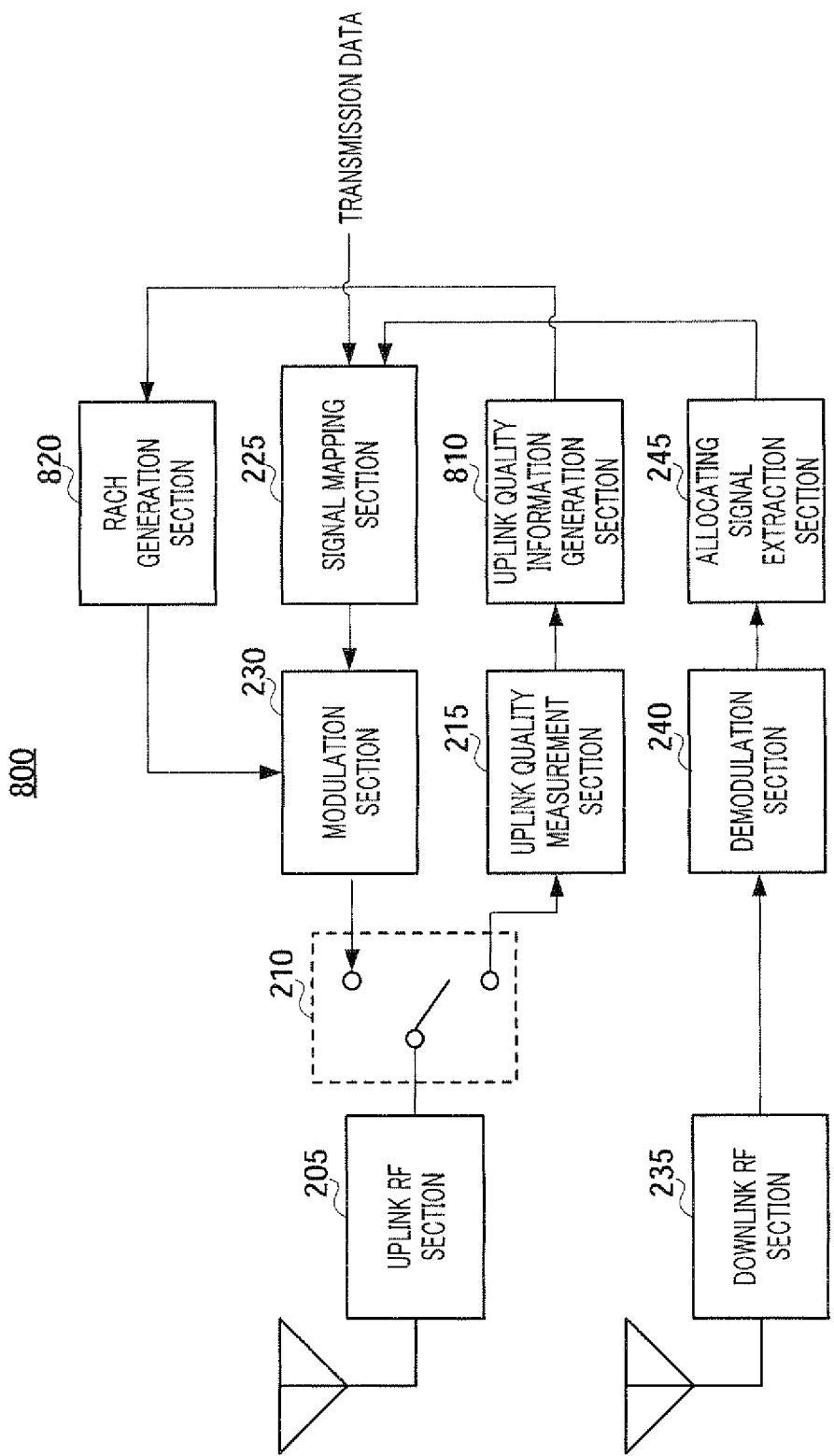
FIG. 15 is a block diagram showing the configuration of the mobile terminal apparatus according to Embodiment 5.

Referring to FIG. 15, mobile terminal apparatus 800 in the radio communication system in the present embodiment has uplink quality information generation section 810 and RACH generation section 820.

Uplink quality information generation section 810 generates channel quality information to be reported to radio base station apparatus 700 based on channel quality measured in uplink quality measurement section 215. To be more specific, uplink quality information generation section 810 generates channel quality information only on the bands where measurement channel quality is equal to or better than a predetermined level and further generates band information related to the bands.

RACH generation section 820 forms a RACH signal included in the channel quality information generated in uplink quality information generation section 810. Further, based on the band information generated in uplink quality information generation section 810, RACH generation section 820 maps the formed RACH signal to the bands where the channel quality information included in the RACH signal is measured. The resulting mapped signal is outputted to modulation section 230.

Further, RACH generation section 820 retransmits the RACH signal when RACH generation section 820 does not receive an ACK in a certain period after the RACH signal is transmitted. To be more specific, RACH generation section 820 transmits a RACH signal in the band of the second highest quality following the channel quality shown in the channel quality information included in the RACH signal transmitted last time.

Figure 16:
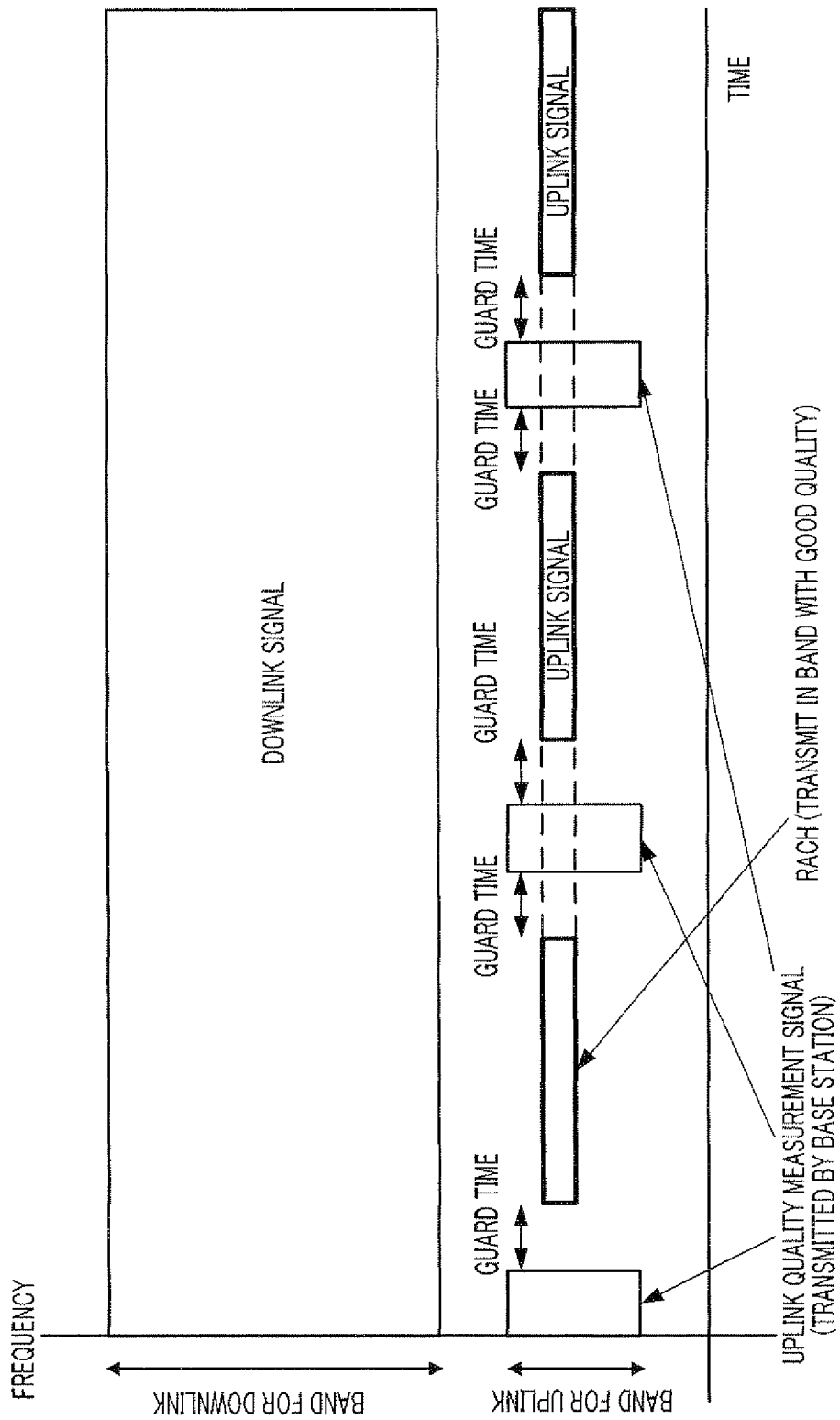
FIG. 16 is an illustration provided to explain communication carried out in the radio communication system in Embodiment 5.

Next, FIG. 16 shows a situation of communication carried out in the radio communication system having the above configuration.

As shown in the figure, mobile terminal apparatus 800 transmits the RACH signal using part of the bands amongst the bands where radio base station apparatus 700 has transmitted uplink quality measurement pilot signals. This RACH signal includes channel quality information showing channel quality equal to or better than a predetermined level. Further, the bands used to transmit the RACH signal corresponds to the bands where the channel quality information included in the RACH signal is measured. That is, the bands where a RACH signal is transmitted itself shows their band information. By this means, the band information is not included in transmission data and needs not be transmitted included in transmission data, so that it is possible to reduce system traffic by the band information.

Upon detecting the RACH signal transmitted from mobile terminal apparatus 800, radio base station apparatus 700 transmits an ACK showing to have received the RACH signal correctly, to mobile terminal apparatus 800 having transmitted the RACH signal.

Upon receiving this ACK, mobile terminal apparatus 800 for the first time transmits an uplink signal in bands according to the band allocating report signal transmitted from radio base station apparatus 700.

Further, when mobile terminal apparatus 800 does not receive the ACK in a certain period, mobile terminal apparatus 800 determines that radio base station apparatus 700 has not received the RACH signal correctly due to, for example, a collision with a RACH signal transmitted from another terminal, and retransmits the RACH signal. To be more specific, mobile terminal apparatus 800 transmits the RACH signal in the band of the second highest quality following the channel quality shown in the channel quality information included in the RACH signal transmitted last time.

In this way, according to the present embodiment, mobile terminal apparatus 800 has uplink quality information generation section 810 and RACH generation section as reporting means for reporting bands where uplink communication quality is equal to or better than a predetermined level, as communication quality information to radio base station mobile station apparatus 700 by transmitting a RACH signal in the bands.

By this means, band information can be reported in the bands themselves where the RACH signal is transmitted, and therefore, it is not necessary to transmit band information included in transmission data. As a result, system traffic can be reduced.

Although a case has been explained above where, upon retransmission of the RACH signal, the RACH signal is retransmitted in the band of the second highest channel quality, the present invention is not limited to this, and, the same RACH signal may be retransmitted on a random time period basis in the same bands as the bands where the RACH signal is transmitted last time. Further, the RACH signal including channel quality information of the bands may be transmitted in the band of second highest quality following the channel quality shown in the channel quality information included in the RACH signal transmitted last time.

Further, although a case has been explained above where radio base station apparatus 700 transmits an ACK apart from the allocating report signal, to mobile terminal apparatus 800, the allocating report signal itself may also be handled as the ACK.

Furthermore, although a case has been explained above about using the RACH, the following methods may be adopted That is, instead of RACH, even during normal communication, the mobile terminal apparatus matches candidates of the bands where the mobile terminal apparatus reports quality with candidates of bands for data transmission. Then, quality information is scrambled or repeated using terminal-specific sequences. By this means, it is possible to check quality information at the radio base station apparatus end even if the mobile terminal apparatus collides with another terminal in bands for reporting and transmission.

Embodiment 6

With the present embodiment, in response to a bandwidth shown in a band allocation request from the mobile terminal apparatus to the radio base station apparatus, whether the mobile terminal apparatus or the radio base station apparatus transmits an uplink pilot signal for CQI measurement is switched.

Figure 17:
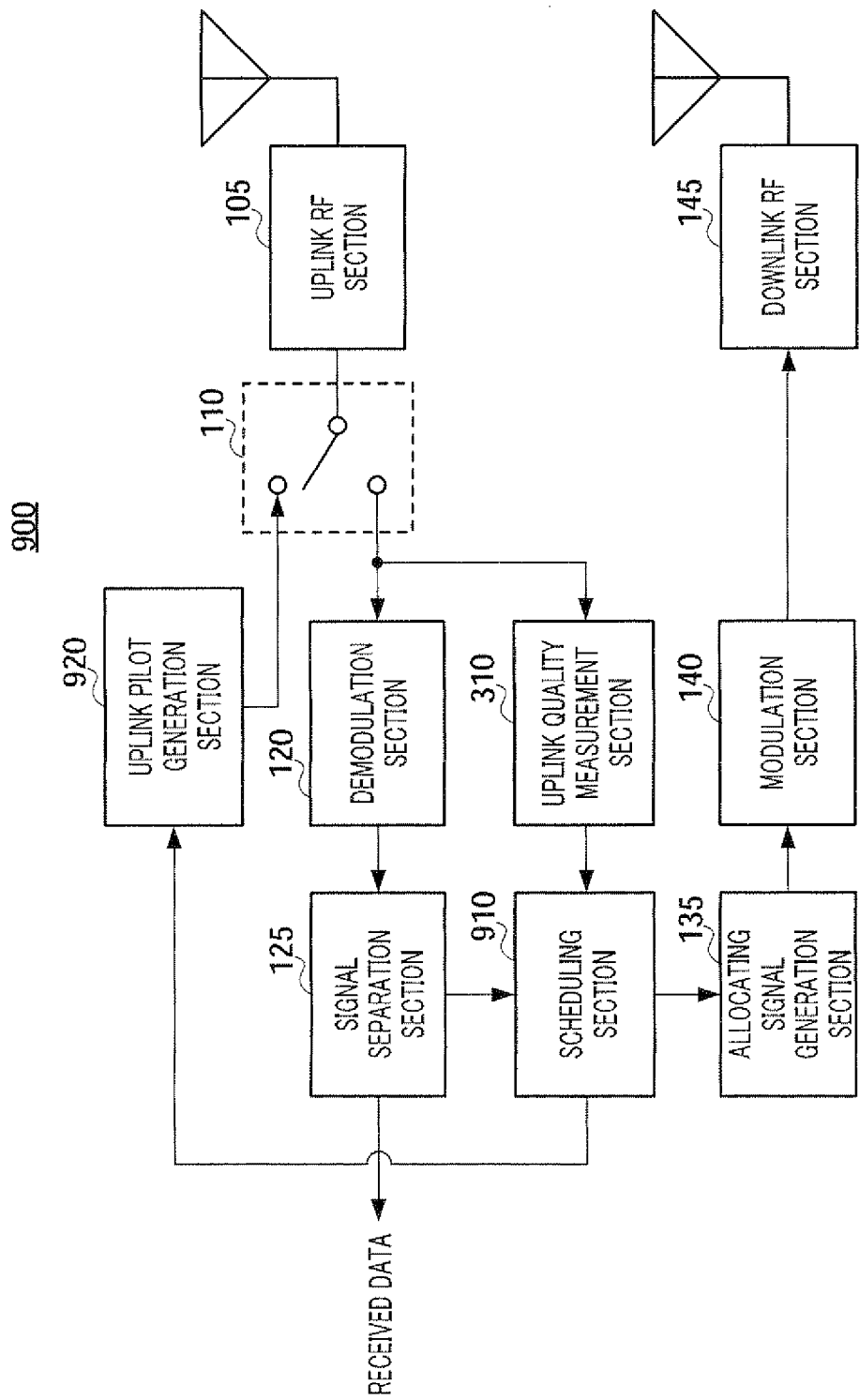
FIG. 17 is a block diagram showing the configuration of the radio base station apparatus according to Embodiment 6.

Referring to FIG. 17, radio base station apparatus 900 in the radio communication system of the present embodiment has scheduling section 910 and uplink pilot generation section 920.

Scheduling section 910 allocates bands to the mobile terminal apparatus in response to a band allocation request and according to channel quality information transmitted from the mobile terminal apparatus in the cell radio base station apparatus 900 covers. The channel quality information used in the band allocation here, is channel quality information from the mobile terminal apparatus and channel quality information measured based on the uplink pilot signal for CQI measurement transmitted from the mobile terminal apparatus.

Further, based on a requested bandwidth, which the bandwidth allocation request transmitted from the mobile terminal apparatus shows, scheduling section 910 controls whether the mobile terminal apparatus or the radio base station apparatus transmits an uplink pilot signal for CQI measurement.

That is, when the requested bandwidth is equal or better than a predetermined value, that is, when it is determined that the mobile terminal station would have heavy load to transmit an uplink pilot signal for CQI measurement from the aspect of, for example, power consumption, scheduling section 910 controls radio base station apparatus 900 to transmit the uplink pilot signal for CQI measurement. At this time, scheduling section 910 outputs an output command signal of an uplink pilot signal for CQI measurement, to uplink pilot generation section 920.

Further, when the requested bandwidth is less than the predetermined value, that is, when it is determined that the mobile terminal station would have light load to transmit an uplink pilot signal for CQI measurement from the aspect of, for example, power consumption, the mobile terminal apparatus transmits the uplink pilot signal for CQI measurement, and therefore scheduling section 910 does not output an output command signal for an uplink pilot signal for CQI measurement.

Figure 18:
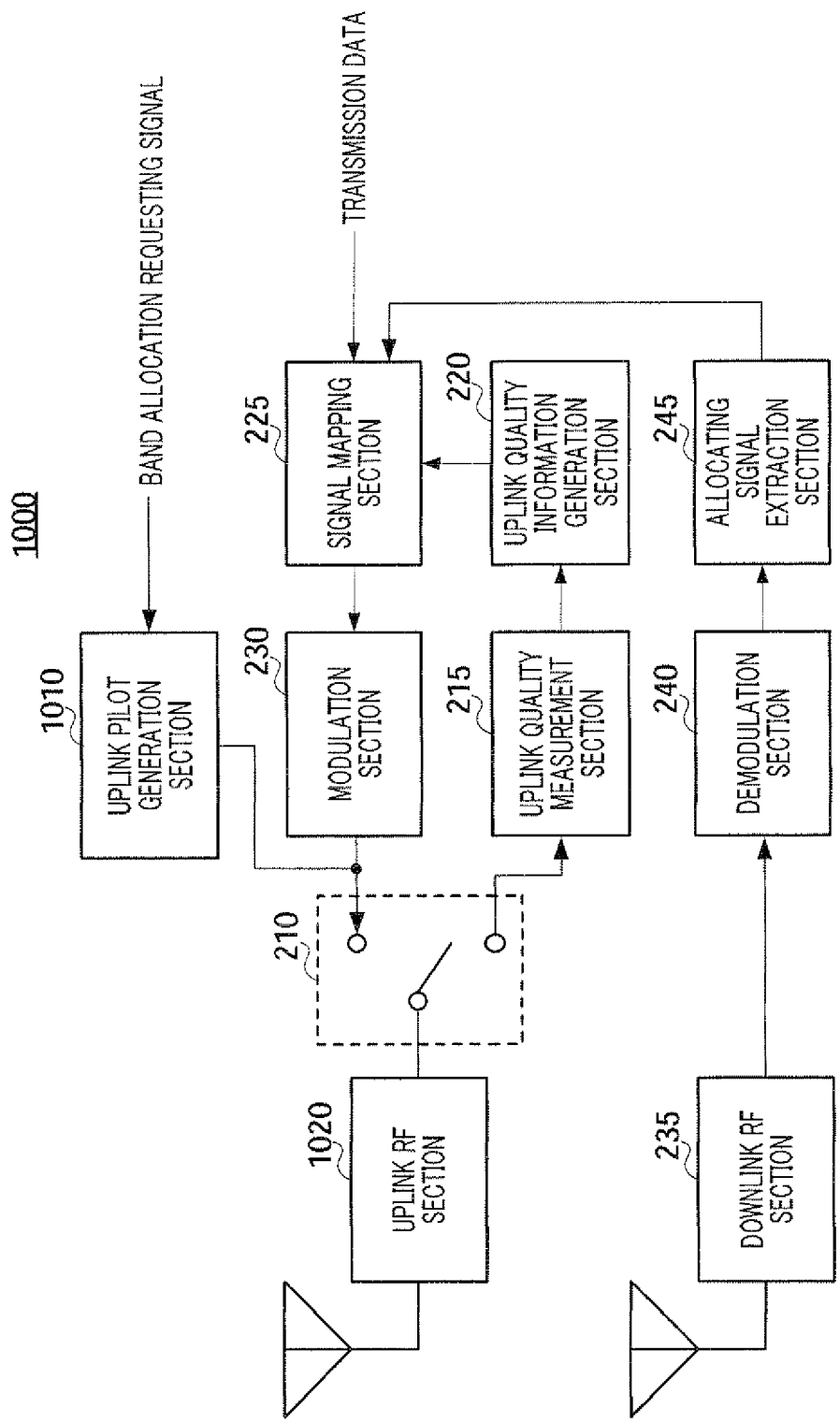
FIG. 18 is a block diagram showing the configuration of the mobile terminal apparatus according to Embodiment 6.

Referring to FIG. 18, mobile terminal apparatus 1000 in the radio communication system with the present embodiment has uplink pilot generation section 1010 and uplink RF section 1020.

When the requested bandwidth the band allocation request signal shows is less than a predetermined value, uplink pilot generation section 1010 outputs an uplink pilot signal for CQI measurement.

Uplink RF section 1020 transmits the uplink pilot signal for CQI measurement outputted from uplink pilot generation section 1010 in the frequency band reported as the pilot transmission band in advance from radio base station apparatus 900.

Figure 19:
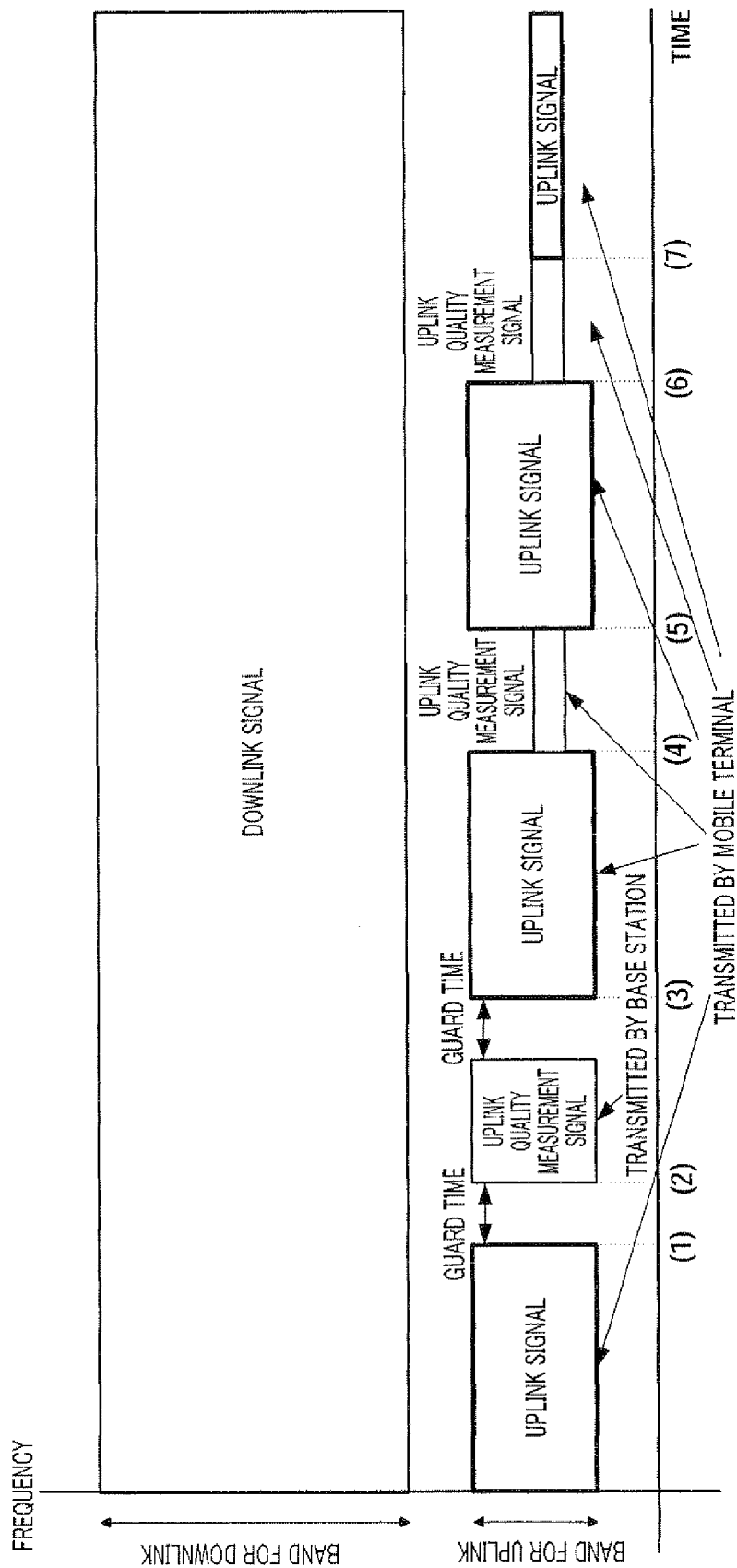
FIG. 19 is an illustration provided to explain communication carried out in the radio communication system in Embodiment 6.

Next, FIG. 19 shows a situation of communication carried out in the radio communication system having the above configuration.

Mobile terminal apparatus 1000 transmits the band allocation request to radio base station apparatus 900 by timing 1 in the figure. This band allocation request is to request bands in the uplink period between timing 5 and timing 6 in the figure.

At this time, when the requested bandwidth according to the band allocation request transmitted from mobile terminal apparatus 1000 is equal or better than the predetermined value, as shown in timing 2 in the figure, scheduling section 910 in radio base station apparatus 900 controls radio base station apparatus 900 to transmit the uplink pilot signal for CQI measurement.

During the uplink period between timing 3 and timing 4, mobile terminal apparatus 1000 reports quality to radio base station apparatus 900. Further, during the uplink period between timing 3 and timing 4, radio base station apparatus 900 allocates bands for use to mobile terminal apparatus 1000 based on this report, and transmits the allocation result to mobile terminal apparatus 1000 in downlink. Further, during the uplink period between timing 3 and timing 4, mobile terminal apparatus 1000 transmits the band allocation request regarding uplink period beginning from timing 7, to radio base station apparatus 900.

At this time, when the requested bandwidth according to the band allocation request transmitted from mobile terminal apparatus 1000 is less than the predetermined value, during the uplink period between timing 4 and timing 5, the uplink pilot signal for CQI measurement is transmitted not from radio base station apparatus 900, but from mobile terminal apparatus 1000 to radio base station apparatus 900. The bands where mobile terminal apparatus 1000 transmits the uplink pilot signal for CQI measurement is reported from radio base station apparatus 900 to mobile terminal apparatus 1000 in advance.

Further, during the uplink period between timing 5 and timing 6, the bands allocation request according to the uplink transmission period next to the uplink transmission period beginning from timing 7 is transmitted to radio base station apparatus 900. The requested bandwidth according to the band allocation request at this time is less than the predetermined value, so that, during the uplink period between timing 6 and timing 7, the uplink pilot signal for CQI measurement is transmitted from mobile terminal apparatus 1000 to radio base station apparatus 900.

In this way, according to the present embodiment, when a requested bandwidth according to a band allocation request is less than a predetermined value, mobile terminal apparatus 1000 transmits an uplink pilot signal for CQI measurement in the bands in the bandwidth in response to the requested bandwidth. This bandwidth where the uplink pilot signal for CQI measurement is transmitted is set equal to or a little wider than the requested bandwidth according to the band allocation request. In any cases, the bandwidth is set enough to be narrow band compared to the entire uplink band.

By this means, it is possible to reduce the loss of uplink use efficiency by guard times that is provided whereby the radio base station apparatus transmits the uplink pilot signal for CQI measurement. Further, the uplink pilot signal for CQI measurement is transmitted in the bands in the bandwidth according to the requested bandwidth, so that it is possible to reduce power consumption of the mobile terminal apparatus.

The requested bandwidth is normally proportional to the amount of transmission data, so that mobile terminal apparatus 1000 may transmit the uplink pilot signal for CQI measurement when the amount of transmission data is equal or better than a predetermined amount.

Further, by determining the bands where mobile terminal apparatus 1000 transmits an uplink pilot signal for CQI measurement in advance, signaling for switching the entity to transmit the uplink pilot signal for CQI measurement is not necessary between radio base station apparatus 900 and mobile terminal apparatus 1000.

Further, according to the present embodiment, radio base station apparatus 900 transmits the uplink pilot signal for CQI measurement only when the bandwidth requested to be allocated from the mobile terminal apparatus is equal or better than a predetermined value.

Although a case has been explained above where entity to transmit an uplink pilot signal for CQI measurement is switched according to the requested bandwidth of mobile terminal apparatus 1000, the present invention is not limited to this, and, the entity to transmit an uplink pilot signal for CQI measurement may be switched according to QoS required in communications. For example, in cases where a delay requirement is small, load is little, or, guaranteed transmission speed is slow or transmission speed is not as guaranteed and so on, mobile terminal apparatus 1000 may transmit an uplink pilot signal for CQI measurement.

Furthermore, although a case has been explained above where mobile terminal apparatus 1000 transmits an uplink pilot signal for CQI measurement according to the requested bandwidth in an autonomous manner, the present invention is not limited to this, and, radio base station apparatus 900 may report the uplink pilot signal for CQI measurement to mobile terminal apparatus 1000 whenever using, for example, a control signal. That is, by the control of radio base station apparatus 900, the entity to transmit the uplink pilot signal for CQI measurement may be switched.

In this case, for example, when the requested bandwidth is less than a predetermined value, that is, when it is determined that the mobile terminal station would have light load to transmit an uplink pilot signal for CQI measurement from the aspect of, for example, power consumption, scheduling section 910 controls the mobile terminal apparatus to transmit an uplink pilot signal for CQI measurement. At this time, scheduling section 910 allocates the mobile terminal uplink pilot transmission period and the bands where the mobile terminal apparatus transmits a pilot, to the mobile terminal apparatus. By reporting the mobile terminal uplink pilot transmission period and the bands where the mobile terminal apparatus transmits a pilot to mobile terminal apparatus 1000, mobile terminal apparatus 1000 transmits an uplink pilot signal for CQI measurement in the mobile terminal uplink pilot transmission period in the bands.

Further, in the case where the entity to transmit an uplink pilot signal for CQI measurement is switched according to the control of mobile terminal apparatus 1000, radio base station apparatus 900 knows the number of mobile terminal apparatuses 1000 as scheduling targets, so that radio base station apparatus 900 may switch the entity to transmit an uplink pilot signal for CQI measurement according to the number of terminals of scheduling targets. For example, in the case where the number of terminals is equal or better than a predetermined number, radio base station apparatus 900 controls the mobile terminal apparatuses to transmit an uplink pilot signal for CQI measurement.

Further, similarly, radio base station apparatus 900 receives the band allocation request from mobile terminal apparatuses 1000, which are scheduling targets, so that radio base station apparatus 900 may switch the entity to transmit an uplink pilot signal for CQI measurement based on the total sum of all bands requested to be allocated. In this case, radio base station apparatus 900 transmits an uplink pilot signal for CQI measurement only when the total sum of all bands requested to be allocated is equal or better than a predetermined value. When the total sum of all bands requested to be allocated is less than the predetermined value, mobile terminal apparatuses 1000 transmit uplink pilot signals for CQI measurement.

Embodiment 7

With this embodiment, according to the level of delay spread in a multipath environment, whether the mobile terminal apparatus or the radio base station apparatus transmits an uplink pilot signals for CQI measurement is switched.

Figure 20:
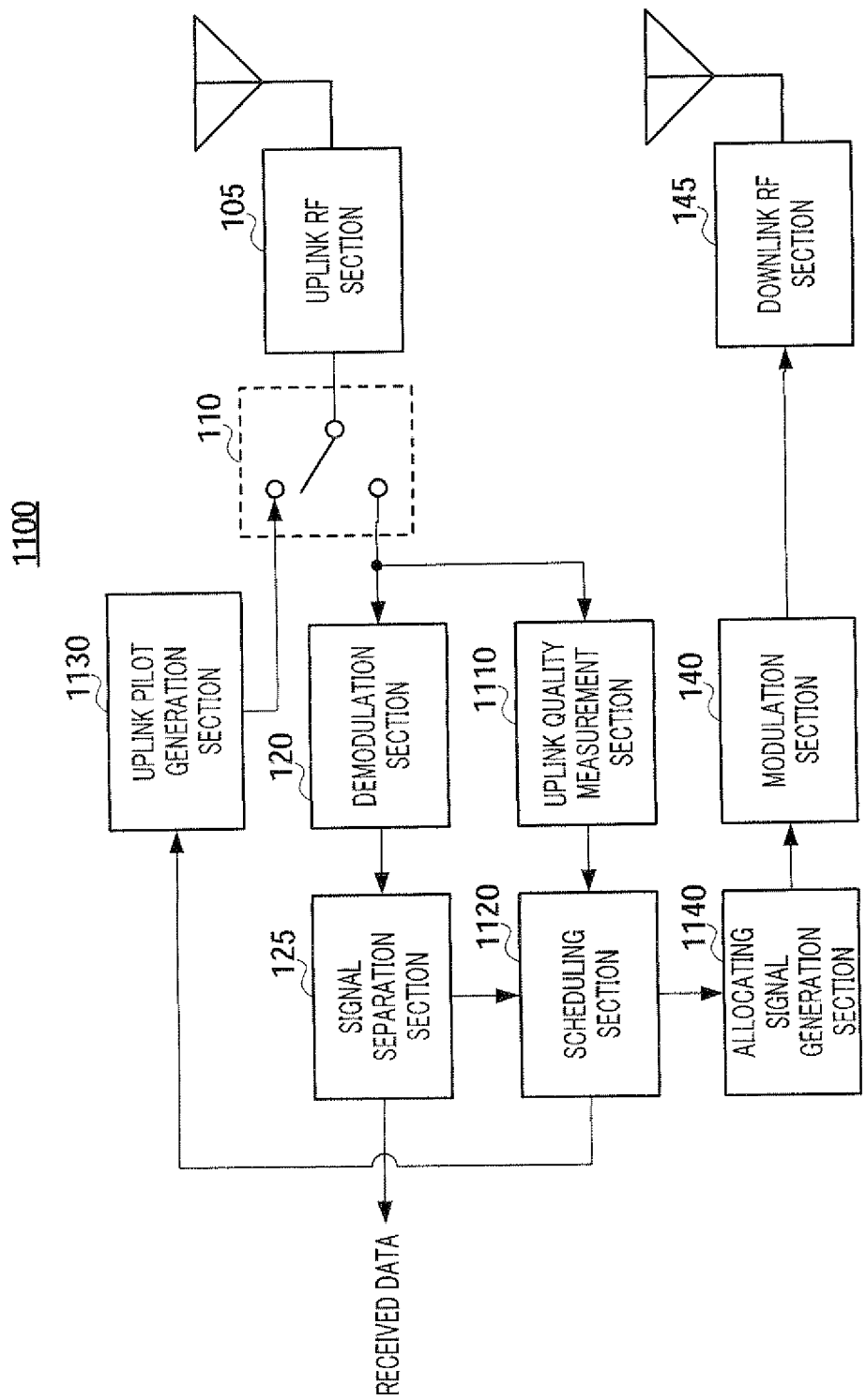
FIG. 20 is a block diagram showing the configuration of the radio base station apparatus according to Embodiment 7.

Referring to FIG. 20, radio base station apparatus 1100 in the radio communication system of the present embodiment has uplink quality measurement section 1110, scheduling section 1120, uplink pilot generation section 1130 and allocating signal generation section 1140.

Uplink quality measurement section 1110 measures uplink channel quality based on the uplink pilot signal for CQI measurement transmitted from the mobile terminal apparatus in the mobile terminal uplink pilot transmission period. Further, uplink quality measurement section 1110 measures delay spread in the multipath environment using the uplink pilot signal for CQI measurement transmitted from the mobile terminal apparatus. To be more specific, uplink quality measurement section 1110 creates a delay profile using the received uplink pilot signal for CQI measurement and measures the distances between peaks of the received uplink pilot signal for CQI measurement in the acquired delay profile.

Scheduling section 1120 allocates bands to the mobile terminal apparatus in the cell radio base station apparatus

1100 covers according to channel quality information. The channel quality information used in the band allocation here, is channel quality information from the mobile terminal apparatus or channel quality information measured in uplink quality measurement section 1110 based on the uplink pilot signal for CQI measurement transmitted from the mobile terminal apparatus.

Further, based on the delay spread transmitted from the mobile terminal apparatus, or the delay spread measured in uplink quality measurement section 1110 based on the uplink pilot signal for CQI measurement transmitted from the mobile terminal apparatus, scheduling section 1120 controls whether the mobile terminal apparatus or the radio base station apparatus transmits the uplink pilot signal for CQI measurement.

In the case of controlling radio base station apparatus 1100 to transmit the uplink pilot signal for CQI measurement, scheduling section 1120 outputs an output command signal for the uplink pilot signal for CQI measurement, to uplink pilot generation section 1130, and transmits the report signal for reporting mobile terminal apparatus 1200 (described later) in downlink in the event that radio base station apparatus 1100 transmits the uplink pilot signal for CQI measurement in the entire uplink band.

Further, in the case of controlling the mobile terminal apparatus to transmit the uplink pilot signal for CQI measurement, scheduling section 1120 allocates the mobile terminal uplink pilot transmission period and the bands where the mobile terminal apparatus transmits the pilot, to the mobile terminal apparatus.

In response to the output command signal of uplink pilot signal for CQI measurement from scheduling section 1120, uplink pilot generation section 1130 outputs the uplink pilot signal for CQI measurement to uplink RF section 105.

Allocating signal generation section 1140 forms an uplink allocation report pilot signal including the mobile terminal uplink pilot transmission period and pilot transmission bands showing the bands where the mobile terminal apparatus transmits a pilot in the period, according to the allocation result according to the pilot signal in scheduling section 1120. Further, allocating signal generation section 1140 forms an allocating report signal showing the uplink band allocation result in scheduling section 1120.

Figure 21:
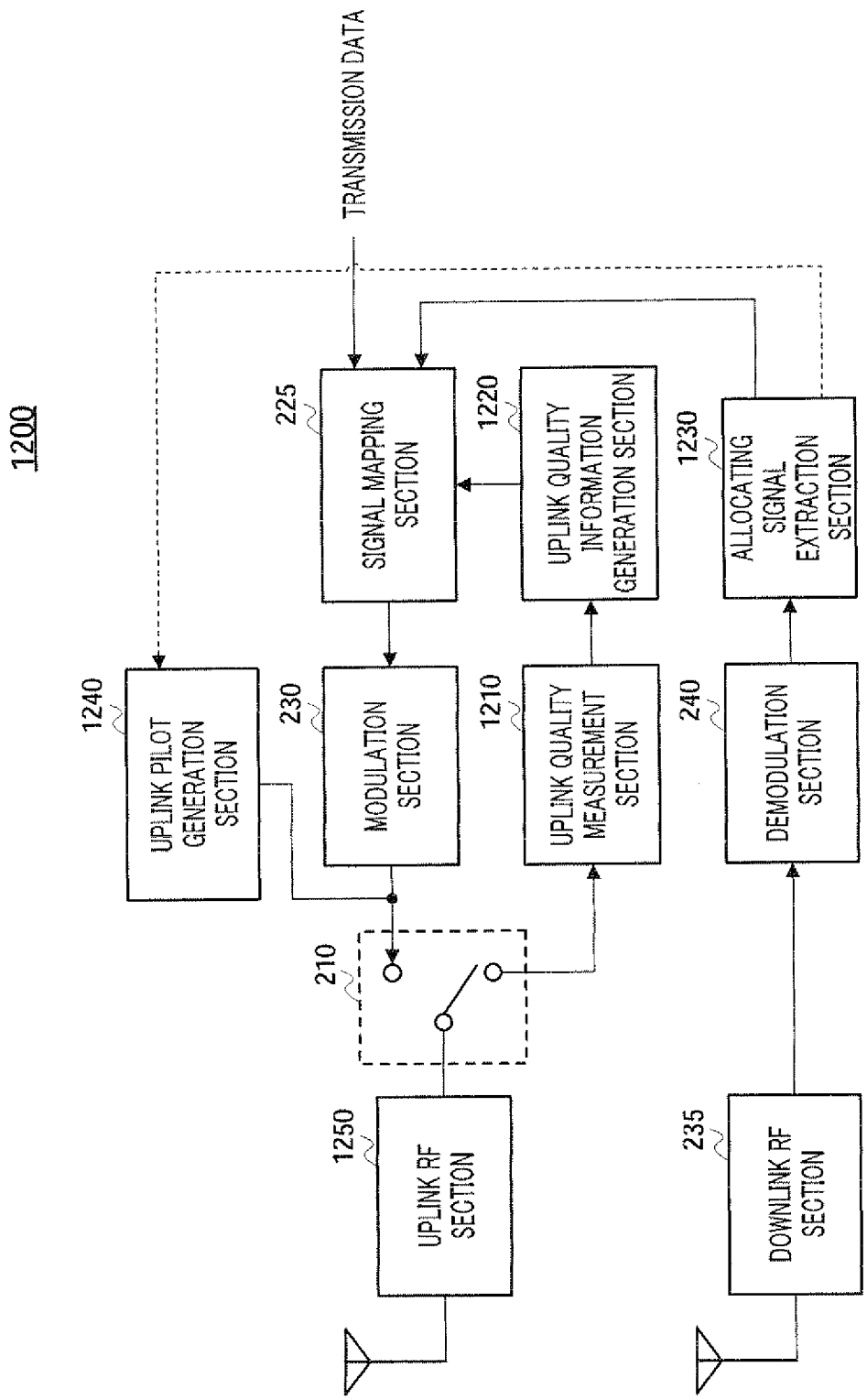
FIG. 21 is a block diagram showing the configuration of the mobile terminal apparatus according to Embodiment 7.

Referring to FIG. 21, mobile terminal apparatus 1200 in the radio communication system in the present embodiment has uplink quality measurement section 1210, uplink quality information generation section 1220, allocating signal extraction section 1230, uplink pilot generation section 1240 and uplink RF section 1250.

Uplink quality measurement section 1210 measures the channel quality in the uplink bands based on the uplink pilot signal for CQI measurement. Further, uplink quality measurement section 1210 measures delay spread in the multipath environment using the uplink pilot signal for CQI measurement.

Uplink quality information generation section 1220 generates channel quality information to be reported to radio base station apparatus 1100 based on the channel quality measured in uplink quality measurement section 1210. Further, uplink quality information generation section 1220 generates delay spread information to be reported to radio base station apparatus 1100 based on the delay spread measured in uplink quality measurement section 1210. The resulting channel quality information and delay spread information is transmitted to radio base station apparatus 1100 via signal mapping section 225, modulation section 230 and uplink RE section 1250.

Allocating signal extraction section 1230 extracts an allocating report signal and an uplink allocation report pilot signal from the demodulated data. The extracted allocating report signal is outputted to signal mapping section 225. The extracted uplink allocation report pilot signal is outputted to uplink pilot generation section 1240.

According to the mobile terminal uplink pilot transmission period included in the uplink allocation report pilot signal, uplink pilot generation section 1240 outputs the uplink pilot signal for CQI measurement based on the period to uplink RF section 1250. At this time, the pilot transmission bands included in the uplink allocation report pilot signal is outputted to uplink RF section 1250.

Uplink RF section 1250 transmits the uplink pilot signal for CQI measurement in the mobile terminal uplink pilot transmission period in the pilot transmission bands received from uplink pilot generation section 1240.

Figure 22:
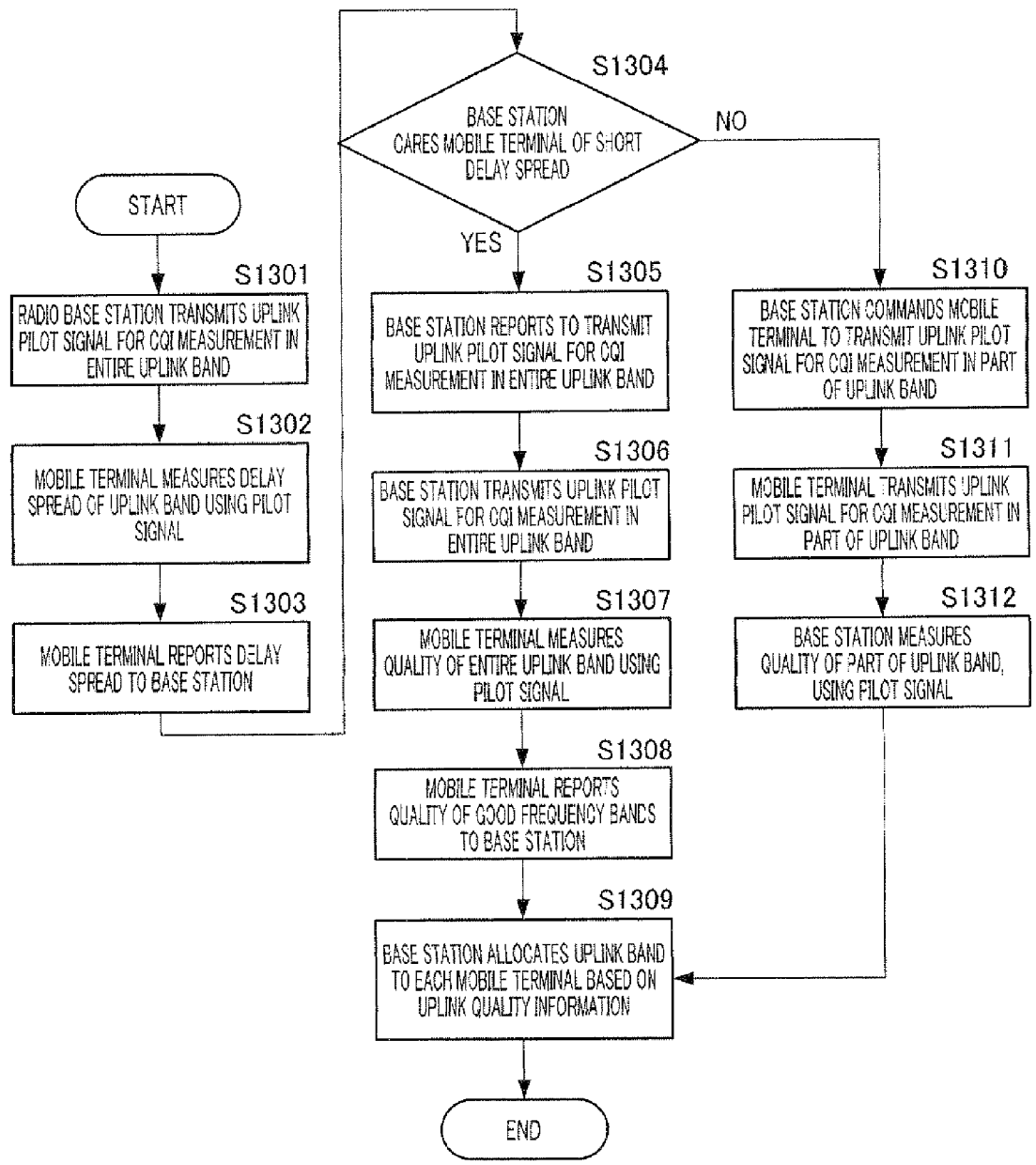
FIG. 22 is a flow chart of operations in the radio communication system of Embodiment 7.

Next, the operations of the radio communication system having the above configuration will be explained using FIG. 22.

In step S1301, radio base station apparatus 1100 transmits the uplink pilot signal for CQI measurement in the entire uplink band.

In step S1302, uplink quality measurement section 1210 in mobile terminal apparatus 1200 measures the delay spread using the uplink pilot signal for CQI measurement transmitted from radio base station apparatus 1100.

In step S1303, uplink quality information generation section 1220 in mobile terminal apparatus 1200 generates delay spread information, and reports the acquired delay spread information to radio base station apparatus 1100.

In step S1304, based on the delay spread information received from each mobile terminal apparatus 1200, radio base station apparatus 1100 decides whether or not to care mobile terminal apparatus 1200 of short delay spread. That is, based on the delay spread information, scheduling section 1120 in radio base station apparatus 1100 decides whether mobile terminal apparatus 1200 or radio base station apparatus 1100 transmits the uplink pilot signal for CQI measurement.

Here, delay spread under a multipath environment relates to frequency selectivity of channel quality. That is, in the case of long delay spread as shown in FIG. 23A, channel quality per frequency unit fluctuates strongly, that is, frequency selectivity increases. On the other hand, in the case of short delay spread as shown in FIG. 23B, channel quality per frequency unit fluctuates gently, that is, frequency selectivity decreases.

FIG. 23 shows the bands of uplink pilot signals for CQI measurement of rectangular shapes transmitted from mobile terminal apparatus 1200. As shown in the figure, the bands used to transmit an uplink pilot signal for CQI measurement by mobile terminal apparatus 1200 is part of the uplink bands. For this reason, in the case of long delay spread shown in FIG. 23A, it is likely that bands of good channel quality are included in the transmission band, even if mobile terminal apparatus 1200 transmits an uplink pilot signal for CQI measurement. As a result, radio base station apparatus 1100 measures channel quality using the uplink pilot signal for CQI measurement transmitted from mobile terminal apparatus 1200 and can allocate bands for use of mobile terminal apparatus 1200 to the bands of good channel quality based on this measurement result. That is, in the case of high frequency selectivity, good quality and bad quality concentrate on a narrow frequency bandwidth, and it is easy to find good bands only by sounding arbitrary limited bands.

On the other hand, in the case of short delay spread shown in FIG. 23B, it is little likely that the bands of good channel quality are included in the selected bands, depending upon where the bands are selected, even if mobile terminal apparatus 1200 transmits an uplink pilot signal for CQI measurement with a narrow band. That is, in the case of low frequency selectivity, it is difficult to find good bands without observing a wide band. If the bands that are not included in the bands of good channel quality are selected as transmission bands of an uplink pilot signal for CQI measurement, radio base station apparatus 1100 cannot perform scheduling with good accuracy. Further, in this case, it is useless that mobile terminal apparatus 1200 transmits an uplink pilot signal for CQI measurement, and also the power in mobile terminal apparatus 1200 is consumed uselessly.

Consequently, in the case of short delay spread shown in FIG. 23B, radio base station apparatus 1100 preferably transmits the uplink pilot signal for CQI measurement in the entire uplink band, receives the report of the channel quality measured in mobile terminal apparatus 1200 using this uplink pilot signal for CQI measurement and preferably performs scheduling based on the channel quality.

Further, with regards to the determination whether or not to care mobile terminal apparatuses 1200 having short delay spread, if there is at least one piece of delay spread in pieces of delay spread transmitted from mobile terminal apparatuses 1200, mobile terminal apparatuses 1200 having short delay spread are determined to be cared, that is, it is determined to control radio base station apparatus 1100 to transmit the uplink pilot signal for CQI measurement in the entire uplink band. Also, it may be determined to care mobile terminal apparatuses 1200 having short delay spread by, for example, fulfilling the following conditions. The "predetermined number of terminals" in the following conditions includes one terminal.

(1) There are at least a predetermined number of mobile terminal apparatuses 1200 having delay spread equal to or less than a predetermined value. (2) There are at least a predetermined number of mobile terminal apparatuses 1200 having delay spread equal to or less than a predetermined value and with low delay requirement. (3) There are at least a predetermined number of mobile terminal apparatuses 1200 having delay spread equal to or less than a predetermined value and having a bandwidth requested to be allocated that is equal or better than a predetermined value. (4) The timing to care terminal apparatuses 1200 having delay spread of equal to or less than predetermined value is determined in advance and when the timing is about to come.

As a result of determination about above step S1304, when mobile terminal apparatus 1200 having short delay spread is determined to be cared (step S1304: YES), radio base station apparatus 1100 reports to mobile terminal apparatus 1200 that radio base station apparatus 1100 transmits the uplink pilot signal for CQI measurement in the entire uplink band (step S1305).

In step S1306, radio base station apparatus 1100 transmits the uplink pilot signal for CQI measurement in the entire uplink band.

In step S1307, uplink quality measurement section 1210 in mobile terminal apparatus 1200 measures the channel quality of the entire uplink band using the uplink pilot signal for CQI measurement transmitted from radio base station apparatus 1100.

In step S1308, uplink quality information generation section 1220 in mobile terminal apparatus 1200 generates channel quality information, and reports this channel quality information to radio base station apparatus 1100. Particularly, bands of good channel quality are reported as channel quality information.

In step S1309, scheduling section 1120 in radio base station apparatus 1100 allocates the uplink bands for use to mobile terminal apparatus 1200 based on channel quality information.

Further, as a result of determination in step S1304, when mobile terminal apparatus 1200 having short delay spread is determined not to be cared (step S1304: NO), radio base station apparatus 1100 commands mobile terminal apparatus 1200 to transmit the uplink pilot signal for CQI measurement in part of the uplink bands (step S1310). The above-described uplink allocating report pilot signal is used for this command.

In step S1311, mobile terminal apparatus 1200 transmits the uplink pilot signal for CQI measurement in the mobile terminal uplink pilot transmission period in the pilot transmission bands commanded by the uplink allocation report pilot signal.

In step S1312, uplink quality measurement section 1110 in radio base station apparatus 1100 measures the channel quality of pilot transmission bands, which are part of the uplink bands, using the uplink pilot signal for CQI measurement. The channel quality measured here is outputted to scheduling section 1120 and used in band allocation processing in scheduling section 1120 in step S1309.

Although a case has been explained with the above flow where channel quality information alone is measured and reported in steps S1307 and S1308, measurement and reporting of delay spread may be carried out together.

With the above explanation about the flow, only the case of deciding whether or not to care mobile terminal apparatus 1200 having short delay spread based on measured delay spread using the uplink pilot signal for CQI measurement transmitted in the entire uplink band by radio base station apparatus 1100. In the case of deciding whether or not to care mobile terminal apparatus 1200 having short delay spread based on measured delay spread using the uplink pilot signal for CQI measurement transmitted in the part of uplink bands by mobile terminal apparatus 1200, for example, in step S1312, the delay spread is measured in uplink quality measurement section 1110. After that, similar determination as in step S1304 will be carried out using this delay spread.

In this way, according to the present embodiment, uplink RF section 105 transmits an uplink pilot signal for communication quality measurement only when frequency selectivity is high as channel quality per frequency unit fluctuates strongly.

By this means, an uplink pilot signal for communication quality measurement is transmitted only when an uplink pilot signal for communication quality measurement is necessary in a wide bandwidth, so that it is possible to reduce opportunities for radio base station apparatus 1100 to transmit the uplink pilot signal for communication quality measurement. As a result, it is possible to reduce the loss of uplink use efficiency due to guard times that need to be provided because the radio base station apparatus transmits uplink pilot signals for CQI measurement.

Further, according to the present embodiment, uplink RF section 1250 transmits an uplink pilot signal for communication quality measurement only when frequency selectivity increases as channel quality per frequency unit fluctuates strongly.

By this means, mobile terminal apparatus 1200 can transmit the uplink pilot signal for communication quality measurement only when the uplink pilot signal for communication quality measurement needs not transmit in a wide band.

For this reason, it is possible to reduce opportunities for radio base station apparatus 1100 to transmit the uplink pilot signal for communication quality measurement. As a result, it is possible to reduce the loss of uplink use efficiency due to guard times that need to be provided because the radio base station apparatus transmits uplink pilot signals for CQI measurement.

Although a case has been explained above where the entity to transmit a pilot is switched for all mobile terminal apparatuses 1200 equally in the cell radio base station apparatus 1100 covers, the present embodiment is not limited to this, and, radio base station apparatus 1100 may make a group of long delay spread transmit a pilot for channel quality in part of uplink bands during a given time period, and make a group of short delay spread transmit a pilot for channel quality in the entire uplink band during another time period, such that mobile terminal apparatuses 1200 having long delay spread and mobile terminal apparatuses 1200 having short delay spread may be divided into groups.

Although a case has been explained above where, when mobile terminal apparatus 1200 reports delay spread to radio base station apparatus 1100, mobile terminal apparatus 1200 reports measured delay spread using the uplink pilot signal for CQI measurement transmitted from base station apparatus 1100 in the uplink bands, the present invention is not limited to this, and, mobile terminal apparatus 1200 may report measured delay spread using a signal that radio base station apparatus 1100 transmits in a downlink band. This is because it is possible that the significance of frequency selectivity based on multipath has correlation between a downlink band and uplink band, even if there is no channel correlation between them.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration. Further, the method of circuit integration is not limited to LSIs, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible. Further, if integrated circuit technology comes out to replace LSIs as a result of the advancement of semiconductor technology or a derivative other technology, it is naturally also possible to carry out function block integration using this technology. Application of biotechnology is also possible.

The disclosures of Japanese Patent Application No. 2006-350455, filed on Dec. 26, 2006, and Japanese Patent Application No. 2007-203333, filed on Aug. 3, 2007, including the specifications, drawings and abstracts, are incorporated herein by reference in their entirety.

INDUSTRIAL APPLICABILITY

The radio base station apparatus, the radio terminal apparatus and the radio communication system of the present invention can reduce power consumption in the radio terminal apparatus. In particular, the present invention is suitable for use in radio communication systems in which a wide band is allocated to uplink, radio base station apparatuses and radio terminal apparatuses that configure the radio communication systems.

The invention claimed is:

1. A radio base station apparatus in a radio communication system in which different frequency bands are used between uplink where a signal is transmitted from a radio terminal apparatus to the radio base station apparatus and downlink where a signal is transmitted from the radio base status apparatus to the radio terminal apparatus, the apparatus comprising:
   a pilot forming section that forms a first pilot signal, which is a signal for measuring communication quality of the uplink at the radio terminal apparatus; and
   a transmission section that transmits the first pilot signal in the downlink in a transmission period for the first pilot signal, using a frequency band used for the uplink; and
   a communication quality measurement section that measures communication quality of the uplink based on a second pilot signal transmitted from the radio terminal apparatus in a band in which the communication quality measured at the radio terminal apparatus based on the first pilot signal is equal to or better than a predetermined level.

2. The radio base station apparatus according to claim 1, wherein the transmission section transmits the first pilot signal in synchronization with another radio base station apparatus in the radio communication system.

3. The radio base station apparatus according to claim 1, further comprising:
   a communication quality information acquisition section that acquires the communication quality measured at the radio terminal apparatus based on the first pilot signal.

4. The radio base station apparatus according to claim 1, wherein:
   the radio base station apparatus has a plurality of frequency bands, into which a frequency domain in the uplink is divided; and
   the transmission section transmits the first pilot signal in synchronization with all of the plurality of frequency bands.

5. The radio base station apparatus according to claim 1, further comprising an information signal generation section that generates an information signal,
   wherein the transmission section transmits the information signal together with the first pilot signal in the transmission period.

6. A radio base station apparatus in a radio communication system in which different frequency bands are used between uplink where a signal is transmitted from a radio terminal apparatus to the radio base station apparatus and downlink where a signal is transmitted from the radio base station apparatus to the radio terminal apparatus, the radio base station apparatus comprising:
   a pilot forming section that forms an first pilot signal, which is a signal for measuring communication quality of the uplink at the radio terminal apparatus;
   a transmission section that transmits the first pilot signal in the downlink in a transmission period for the first pilot signal, using a frequency band used for the uplink; and
   a band allocation section that allocates an uplink band to the radio terminal apparatus in response to a request from the radio terminal apparatus,
   wherein the transmission section transmits the first pilot signal when a bandwidth of an uplink band the radio terminal apparatus requests to allocate is equal to or greater than a predetermined bandwidth or when a delay spread of the ratio terminal apparatus is equal to or smaller than a predetermined value.

7. The radio base station apparatus according to claim 6, wherein, when the bandwidth the radio terminal apparatus requests to allocate is less than the predetermined bandwidth, the transmission section transmits no first pilot signal in the transmission period and the band allocation section allocates the transmission period as a period in which the radio terminal apparatus transmits a second pilot signal.

8. The radio base station apparatus according to claim 6, wherein, when the delay spread of the radio terminal apparatus is greater than the predetermined value, the transmission section transmits no first pilot signal in the transmission period, and the band allocation section allocates the transmission period as a period in which the radio terminal apparatus transmits a second pilot signal.

9. A radio terminal apparatus in a radio communication system in which different frequency bands are used between uplink where a signal is transmitted from a radio terminal apparatus to the radio base station apparatus and downlink where a signal is transmitted from the radio base station to the radio terminal apparatus, the radio terminal apparatus comprising:
- a receiving section that receives a first pilot signal, which is a signal for measuring communication quality of the uplink and which is transmitted from the radio base station apparatus in the downlink in a transmission period for the first pilot signal using a frequency band used for the uplink;
- a quality measurement section that measures communication quality of the uplink based on the first pilot signal;
- a pilot forming section that forms a second pilot signal; and
- a transmission section that transmits the second uplink pilot signal in a band, in which the communication quality measured at the quality measurement section based on the first pilot signal is equal or better than a predetermined level.

10. The radio terminal apparatus according to claim 9, wherein said transmission section transmits the communication quality measured at the quality measurement section based on the first pilot signal.

11. The radio terminal apparatus according to claim 9, wherein the transmission section transmits a random access channel signal in a band, in which the communication quality measured at the quality measurement section based on the first pilot signal is equal to or better than the predetermined level, to the radio base station apparatus.

12. A radio terminal apparatus in a radio communication system in which different frequency bands are used between uplink where a signal is transmitted from a radio terminal apparatus to the radio base station apparatus and downlink where a signal is transmitted from the radio base station apparatus to the radio terminal apparatus, the radio terminal apparatus comprising:
- a receiving section that receives an first pilot signal, which is a signal for measuring communication quality of the uplink and which is transmitted from the radio base station apparatus in the downlink in a transmission period for the first pilot signal using a frequency band used for the uplink;
- a quality measurement section that measures communication quality of the uplink based on the first pilot signal;
- an uplink pilot forming section that forms a second pilot signal; and
- a transmitting section that transmits the second pilot signal when a bandwidth of an uplink band the radio terminal apparatus request to allocate is less than a predetermined bandwidth or when a delay spread of the radio terminal apparatus is greater than a predetermined value.

* * * * *